(12) United States Patent
Miki et al.

(10) Patent No.: US 7,205,428 B2
(45) Date of Patent: Apr. 17, 2007

(54) THIOETHER DERIVATIVES, THEIR METHOD FOR PRODUCTION AND USE

(75) Inventors: Hideki Miki, Koganei (JP); Tatsuo Nakahama, Koganei (JP); Shiyoshi Yokoyama, Koganei (JP); Shinro Mashiko, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 459 days.

(21) Appl. No.: 10/346,078

(22) Filed: Jan. 17, 2003

(65) Prior Publication Data

US 2003/0171507 A1 Sep. 11, 2003

Related U.S. Application Data

(62) Division of application No. 09/988,774, filed on Nov. 20, 2001, now Pat. No. 6,630,578.

(30) Foreign Application Priority Data

Nov. 24, 2000 (JP) ............................. 2000/358444

(51) Int. Cl.
*C07C 323/00* (2006.01)
(52) U.S. Cl. ...................................... 560/18
(58) Field of Classification Search ..................... None
See application file for complete search history.

(56) References Cited

U.S. PATENT DOCUMENTS 2,993,901 A 7/1961 Somerville
4,622,381 A * 11/1986 Suzuki et al. ............... 528/295
4,711,967 A * 12/1987 Urben .......................... 558/243
5,807,971 A 9/1998 Gozzini et al. ............. 528/332

FOREIGN PATENT DOCUMENTS

JP 11-47586 2/1999
WO 99/32540 7/1999

OTHER PUBLICATIONS

Cerfontain et al, Receuil des Traveaux Chimiques des Pays-Bas, The Positional Reactivity Order in the Sulfur Trioxide Sulfonation of Benzene and Naphthalene Derivatives Containing an Electron-Withdrawing Substituent, 1994, 113, pp. 403-410.*
Percec et al., Journal of Organic Chemistry, Synthesis of Functional Aromatic Multisulfonyl Chlorides and Their Masked Precursors, 2001, 66, pp. 2104-2117.
Boiko et al., Zh. Org. Khim., 1-substituted 3,5-bis[(trifluoromethyl)thio- and -sulfonyl]benzenes, 1985, 21(7), pp. 1470-1477.
Patent Abstracts of Japan, vol. 017, No. 627, Nov. 19, 1993 & JP 05 194371 A, Aug. 3, 1993, * abstract *.
H. Miki et al., "Synthesis of New Dendrimers Based on 6,8-Dinitroquinazoline and 3,5-Dimercaptobenzyl Blocks", Materials Research Society Symposium Proceedings, Materials Research Society, vol. 660, 2001, pp. 3201-3206, XP008019229.

* cited by examiner

*Primary Examiner*—Paul A. Zucker
(74) *Attorney, Agent, or Firm*—Wenderoth, Lind & Ponack, L.L.P.

(57) ABSTRACT

The present invention is directed to novel thioether dendritic molecules which respond immediately by emission of light when stimulated with light or electric energy.

1 Claim, 3 Drawing Sheets

THIOETHER DERIVATIVES, THEIR METHOD FOR PRODUCTION AND USE

This application is a divisional application of Ser. No. 09/988,774 filed Nov. 20, 2001, now U.S. Pat. No. 6,630,578.

BACKGROUND OF THE INVENTION

1. Field of the Invention

The present invention relates to novel thioether derivatives, the production method and use thereof, and relates especially to the S containing dendrimers and the synthetic intermediates thereof.

2. Description of the Prior Art

The dendritic molecules, having a unique macromolecular structure, are expected to have a wide field of application. The dendritic molecules which have a unique chemical structure composed of a central core (nucleus), and a branch structure constructed with branches (units) repeated regularly and the surface functional groups, both extending three-dimensionally, have been investigated actively in the field, for example, of nano science, communication science, electro-material science, medical science, pharmaceutical science, biological science, surface science and material science, and so on (References: "Dendritic Molecules", VCH Publication Co. 1996; "Molecular Design of Dendrimers" and "Miscellaneous Functions of Dendrimers" Gendai Kagaku, June, 1998, on pp. 20–40; "Applications of Dendrimers as Non-linear Optical Materials" in Kobunshi, Vol. 47, November, 1998.) It may safely be said, however, that the dendrimer science is "one of the latest sciences", because it has been highlighted only since about the middle of the year 1990 and the number of the research on it has increased recently.

As for the use of the dendritic molecules, there have been offered a variety of inventions on the subject of industrial use thereof, for example, their use in medicine and agricultural chemicals (JP-A Hei7-330631), use in solar cell and photosensitive material for electrophotography (JP-A Hei11-40871), use in electronic material (JP-A Hei 11-171812), use in liquid crystal (JP-A 2000-264965), use in paint and ink (JP-A Hei11-140180), use in fluorescent resin sheet (JP-A Hei11-323324), use in qualitative and quantitative analyses (JP-A Hei11-218494), use in biological response modifier (JP-C Hei8-510761), and so on.

SUMMARY OF THE INVENTION

The object of the present invention is to provide both novel dendritic molecules with useful functions and novel synthetic intermediates for producing them.

More specifically, the main object of the present invention is to provide novel dendrimers which are useful as electronic material (for example, as the switch of memory) due to their ability to emit light from the core by transferring electron which exists in the branch structure into the core which has been made electron deficient by absorbing light or electric energy.

Other objects of the present invention will become clear through the explanation hereinafter.

The present inventors made an intensive investigation on the aforementioned problems and succeeded in creating the S atom containing dendrimers of the present invention.

In addition, the present inventors have obtained a lot of novel knowledge about the dendrimers of the present invention which have many sulfur atom in their branch structures.

Namely, in the case of the sulfur atom we can make use of their d-orbital electrons which do not exist in the oxygen atom. As the d-orbital electrons of the sulfur atom are placed farther apart from the nuclei than the p-orbital electrons of the oxygen atom, the electrons of the sulfur atom can move more freely than the electrons of the oxygen atom; the light or electric energy can be transferred to the core, which is in an electron-deficient state, with ease; it becomes possible to make the core emit light by constructing the core from a residue of a luminescent compound; and a larger polarization between the branch structure and the core can be obtained with the sulfur atoms than with the oxygen atoms. Consequently, the present inventors have got the knowledge that the dendrimers of the present invention are useful as an electronic material, for example, as the switch of memory.

In addition, the present inventors have found that, although S atom-containing dendrimers can suffer deterioration due to oxidation, it is possible to make them more durable and of a long life by placing substituents with steric bulkiness, preferably t-butyl groups, on the outside of the branch structure, namely, at the opposite end across the branch structure from the core.

Furthermore, the present inventors have found that the S atom-containing dendrimers of the present invention can be produced conveniently and industrially advantageously from a series of novel synthetic intermediates of specific structures.

Based on a lot of novel knowledge mentioned above, the present inventors have carried out an intensive investigation on the subject and completed the present invention.

That is to say, the present invention relates to the compounds and salts thereof:

[1] A dendritic molecule characterized in that it comprises or preferably has a core, a branch structure composed of Unit 1 represented by the following structure,

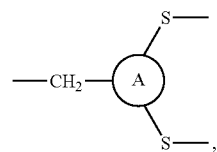

wherein ring A stands for a homo- or heterocyclic six-membered ring, and surface functional groups as the essential constituents.

[2] A dendritic molecule characterized in that it comprises or preferably has a core, a branch structure composed of both Unit 1 described in [1] and Unit 2 represented by the following structure,

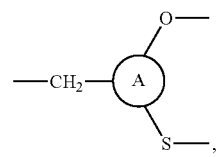

wherein ring A stands for a homo- or heterocyclic six-membered ring, and/or Unit 3 represented by the following structure,

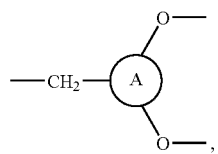

wherein ring A stands for a homo- or heterocyclic six-membered ring, and the surface functional groups.

[3] A dendritic molecule characterized in that it comprises or preferably has a core, a branch structure composed of two or more of the partial branch structures of Unit 1 described in [1], Unit 2 described in [2], and Unit 3 in [2], and the surface functional groups.

[4] A dendritic molecule of any of [1] and [2], wherein the branch structure is of 2–10 generations and is constructed with both a generation or generations of the branch structure composed of Unit 1 described in [1] and a generation or generations of the branch structure Unit 2 described in [2] and/or Unit 3 described in [2].

[5] A dendritic molecule of [1] to [4], wherein the ring A of Unit 1, Unit 2 and Unit 3 is a benzene ring, a pyrimidine ring or a triazine ring.

[6] A dendritic molecule of [1] to [5], wherein the surface functional group is an alkyl group which may be substituted, an aralkyl group which may be substituted, an alkoxy group, an alkoxycarbonyl group or a quaternary ammonium group.

[7] A dendritic molecule of [6], wherein the surface functional group is a t-butyl group.

[8] A dendritic molecule of [1] to [7], wherein the core is a color developing functional group.

[9] A dendritic molecule of [1] to [7], wherein the core is a rhodamine pigment, a quinazoline, a perylene, an azo-compound, 2,5-dihydroxybenzoic acid methyl ester, a porphyrin, 4,4'-dihydroxybiphenyl or 1-(4.4', 4"-trihydroxyphenyl)ethane residue.

[10] A thio-compound represented by the following structure,

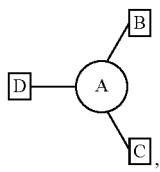

wherein ring A is a ring represented by Formula 5,

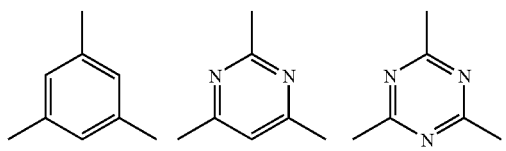

which has each of the substituent B, substituent C and substituent D at the positions denoted with a bond, and may be substituted at the positions where no bond is attached; substituent B stands for —S(O)nR$^1$, wherein n stands for an integer of 0–2, and R$^1$ stands for a substituent;

substituent C stands for —X$^1$R$^2$, wherein X$^1$ stands for a intervening group, and R$^2$ stands for a substituent; and substituent D stands for a substituent bonded to the ring A through a carbon atom.

[11] A thio-compound of [10], wherein R$^1$ and R$^2$ are, each being the same or different, an alkali metal, a hydrogen atom, an alkyl group which may be substituted, an aralkyl group, a carbamoyl group or a thiocarbamoyl group.

[12] A thio-compound of [10] or [11], wherein; X$^1$ is a methylene group, a dimethylmethylene group, an oxygen atom, a sulfur atom, a sulfinyl group or a sulfonyl group.

[13] A thio-compound of any one of [10] to [12], wherein the substituent D is a cyano group, a formyl group or X$^2$R$^3$, wherein X$^2$ stands for a methylene group which may be substituted, a carbonyl group or a thiocarbonyl group, and R$^3$ stands for a hydroxyl group which may be protected, a mercapto group or an amino group, with the proviso that when X$^2$ is a carbonyl group, then R$^3$ is not a hydroxyl.

[14] 3,5-dimercaptobenzyl alcohol.

[15] 3,5-dimercaptobenzyl mercaptan.

[16] A compound represented by the following structure and a salt thereof,

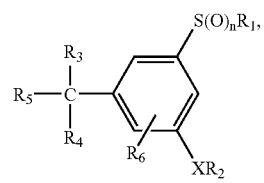

wherein each of R$^1$ and R$^1$ stands for
(1) an alkali metal such as sodium and potassium and so on,
(2) a hydrogen atom,
(3) an alkyl group which may be substituted with a fluorine atom, a chlorine atom, a bromine atom, an alkoxy group or a thioalkoxy group, and so on,
(4) a phenyl group which may be substituted with the aforementioned substituent or substituents, or
(5) an aralkyl group which may be substituted with the aforementioned substituent or substituents,
(6) a disubstituted carbamoyl or thiocarbamoyl group represented by the following structure,

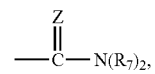

wherein R$^7$ stands for
(1) an alkyl group which may be substituted with a halogen atom such as a fluorine atom, a chlorine atom and a bromine atom,
(2) a phenyl group which may be substituted with aforementioned substituent or substituents, or
(3) an aralkyl group which may be substituted with aforementioned substituent or substituents,
Z stands for an oxygen atom or a sulfur atom,
n stands for an integer of 0 to 2, X stands for a methylene group, a dimethylmethylene group, an oxygen atom, a sulfur atom, a sulfinyl group or a sulfonyl group, Each of $R^3$ and $R^4$ stands for (1) a hydrogen atom, (2) an alkyl group which may be substituted with a halogen atom such as a fluorine atom, a chlorine atom and a bromine atom, and so on, (3) a phenyl group which may be substituted with aforementioned substituent or substituents, or (4) an aralkyl group which may be substituted with aforementioned substituent or substituents, or $R^3$ and $R^4$ may be combined to form a methylene group, a keto group or a thioketo group, or $R^3$, $R^4$ and $R^5$ taken together with the carbon atom to which they are attached may form a cyano group, $R^5$ stands for (1) a hydroxyl group, (2) a mercapto group, (3) an amino group, (4) a formyl group, (5) an alkyl group which may be substituted with a halogen atom such as a fluorine atom, a chlorine atom, a bromine atom, and so on, (6) an alkoxy group which may be substituted with aforementioned substituent or substituents, (7) a thioalkoxy group which may be substituted with aforementioned substituent or substituents, (8) a phenyl group which may be substituted with aforementioned substituent or substituents, (9) an aralkyl group which may be substituted with aforementioned substituent or substituents, $R^6$ means a hydroxyl group, an alkyl group, an alkoxy group, an alkylthio group, a nitro group, a cyano group, a dimethylamino group, or a diethylamino group.

Figure 1:
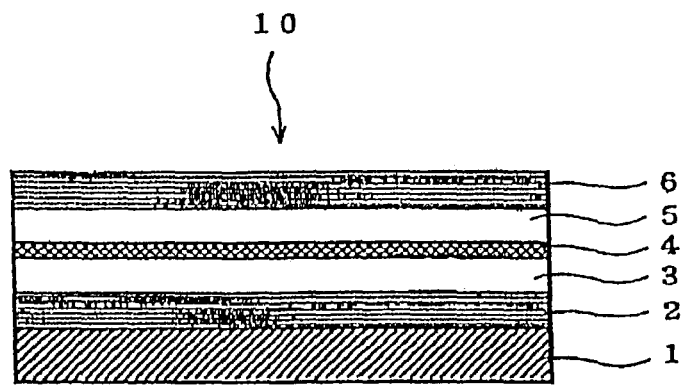
FIG. 1 shows a schematic diagram of the layer structure of a single electron tunneling device of the present invention.

EXPLANATION OF REFERENCE LETTERS OR NUMERALS 1 substrate layer
2 lower electrode
3 lower polyimide LB film layer
4 intermediary electrode layer
5 upper polyimide LB film layer
6 upper electrode
7 reserve upper layer
8 edge-covering layer
9 electron tunneling layer
10 single electron tunneling device
17 step voltage
18 ammeter

DETAILED DESCRIPTION OF THE INVENTION

In the present invention, followings are preferable definitions of the terms:
 alkyl means branched or straight chain alkyl groups having preferably 1 to 6 carbon atoms.
 alkoxy means branched or straight chain alkoxy groups having preferably 1 to 6 Carbon atoms,
 ar for example in aralkyl means aromatic groups with 5 to 12 carbon atoms, preferably 6 carbon atoms, or heteroaromatic groups which are aromatic groups in which one or more carbon atoms, preferably 1, 2 or 3 carbon atoms, have been substituted by hetero atoms, preferably nitrogen or oxygen atoms,
 preferably, the second generation molecules (third generation molecules, etc.) are bonded to their corresponding parent generation molecules by head-tail bonding.

Combined terms such as "aralkyl" means a combination of the residues as defined such as a combination of an "ar" residue and an "alkyl" residue.

If in the present invention it is referred to residues which can be substituted or to substituents, suitable substituent groups are preferably hydrocarbon resins having 1 to 20 carbon atoms, preferably alkyl groups or aralkyl groups as defined above or alkoxy groups as defined above.

An intervening group is Preferably a straight chain or branched $C_{1-6}$ alkylene group, an oxygen atom, a sulfur atom, a sulfinyl group, a sulfonyl group or a $C_{1-6}$ alkylene group which contains an oxygen atom, a sulfur atom, a sulfinyl group or a sulfonyl group.

The surface functional groups are preferably also hydrocarbon groups having 1 to 20 carbon atoms, which may be substituted. More preferably the surface functional groups have the formula

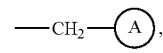

wherein ring A is defined as above and is preferably substituted by 1 to 3 alkyl groups, 1 to 3 alkoxy groups and/or 1 to 3 CONH $(CH_2)_2N^+(CH_3)_3$ groups, preferably t-butyl groups. More preferred is a substitution with 2 groups. Particularly preferred is a substitution with alkyl groups. e.g. t-butyl groups.

In the present invention, as the examples of the homo- or heterocyclic six-membered ring, there can specifically be mentioned a benzen ring, a pyridine ring, a triazine ring, diazine rings (for example, a pyridazine ring, a pyrimidine ring, a pyrazine ring), and so on.

As the surface functional group, there can specifically be mentioned a t-butyl group, $CONH(CH_2)_2N^+(CH_3)_3$, and alkoxy groups including the methoxy group, and so on, the t-butyl group, however, being the most preferred one in the present invention.

As the alkyl groups, there can be mentioned those, which may be straight or branched, or favorably, the carbon number of $C_{1-4}$, exemplified specifically by methyl, ethyl, n-propyl, isopropyl and t-butyl, and so on.

As the aralkyl groups, there can be mentioned benzyl and phenethyl, and so on. As the alkoxy groups, there can be mentioned those, which may be straight or branched, or favorably, the carbon number of $C_{1-4}$, exemplified specifically by a methoxy group, an ethoxy group, an i-propoxy group and a t-butoxy group, and so on.

As the color developing functional groups, those groups, which may be known per se and can be derived, specifically, from rhodamine pigments, quinazoline, perylene, and azocompounds, 2,5-dihydroxybenzoic acid methyl ester, porphyrins, 4,4'-dihydroxybiphenyl or 1-(4.4', 4"-trihydroxyphenyl)ethane, are favorably used.

Although those synthetic intermediates mentioned in [10] to [14] are novel compounds, they can be manufactured with ease according to the methods known per se, as exemplified hereunder.

EXAMPLES

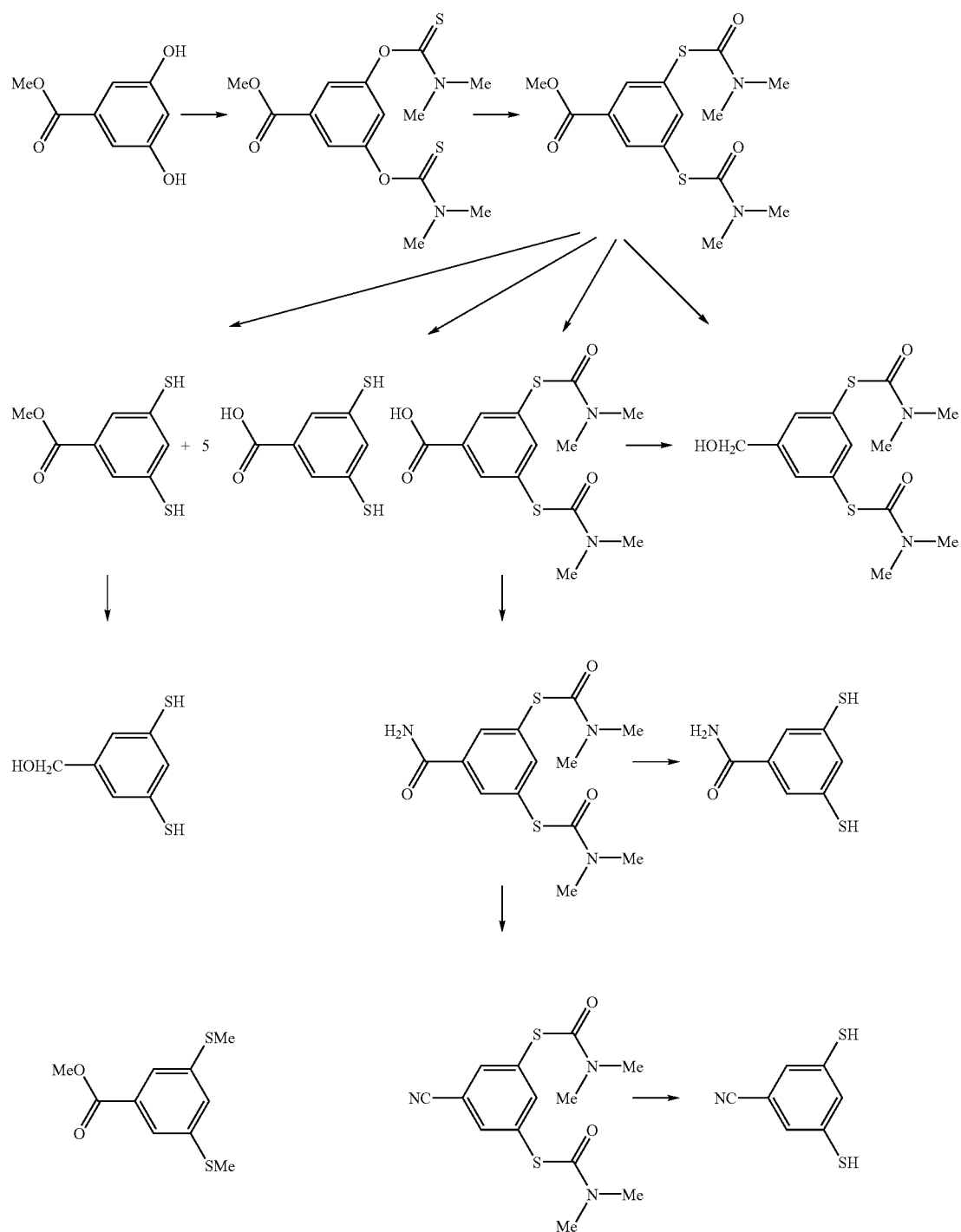

Next, by using the synthetic intermediates obtained above, the dendrimers of the present invention are produced. In the production, either of the two procedures, known per se: a divergent synthetic method, in which the central core inside, the branch structure outside, and the outermost surface functional groups are constructed successively in this order, or a convergent synthetic method, in which the outermost surface functional groups, the branch structure inside and the core at center are constructed successively in this order.

Thus, both the compounds and dendrimers of the present invention shown hereunder can be produced.

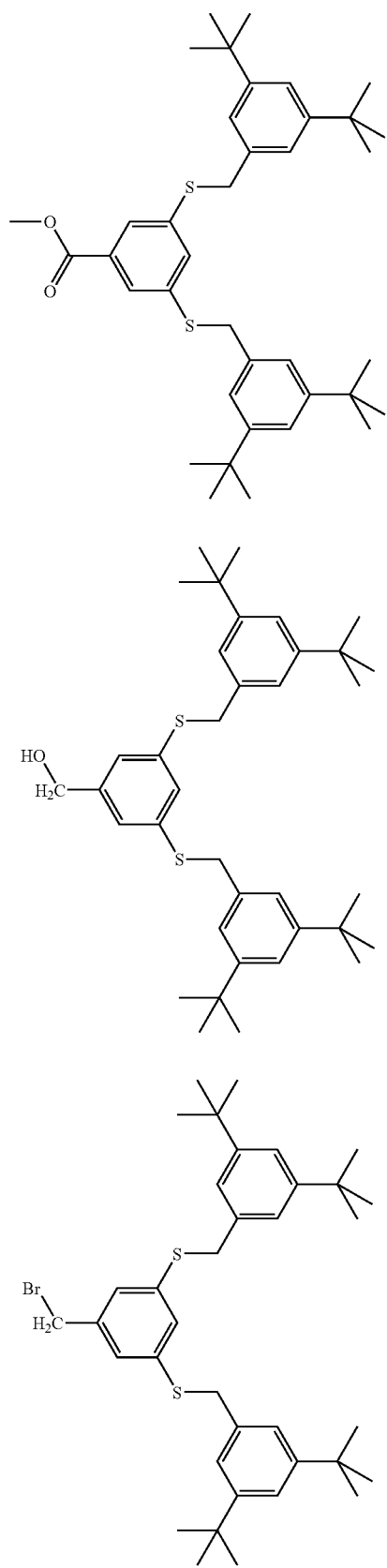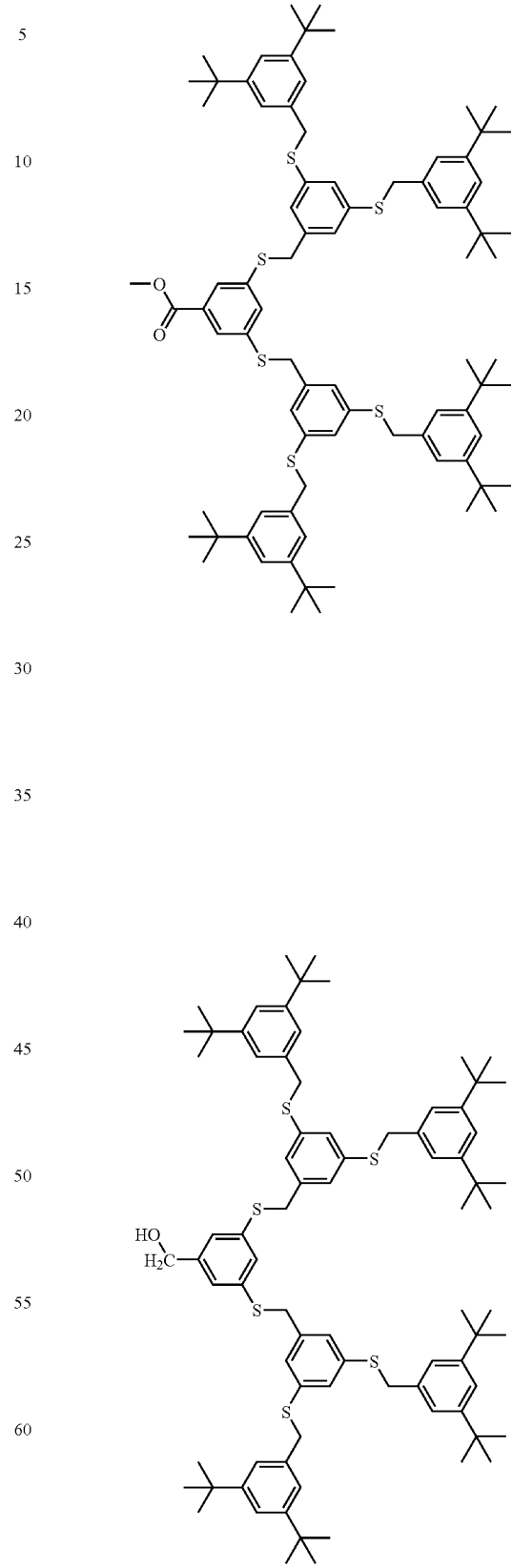

-continued
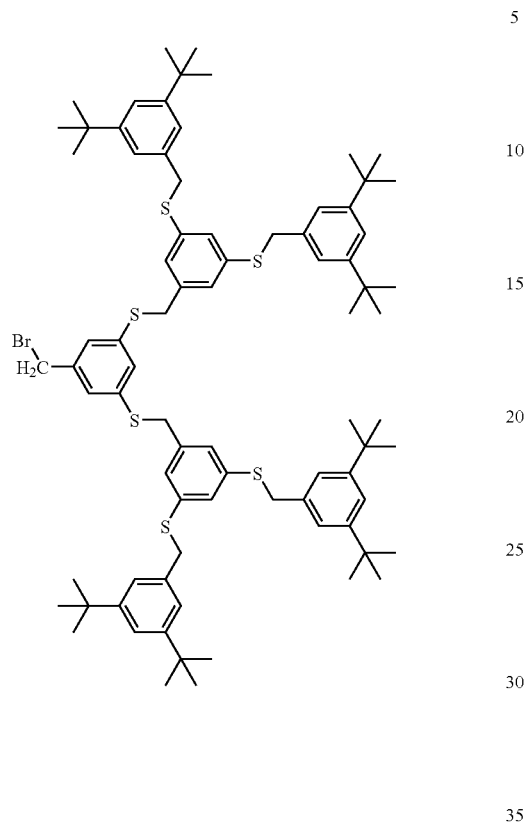
By repeating the procedure mentioned above, a dendrimer of higher generation shown hereunder can be produced.
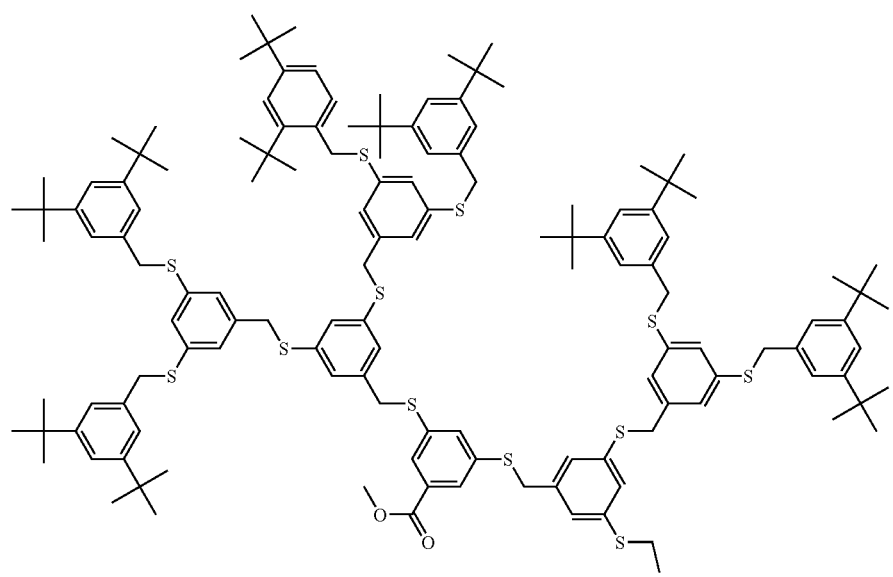

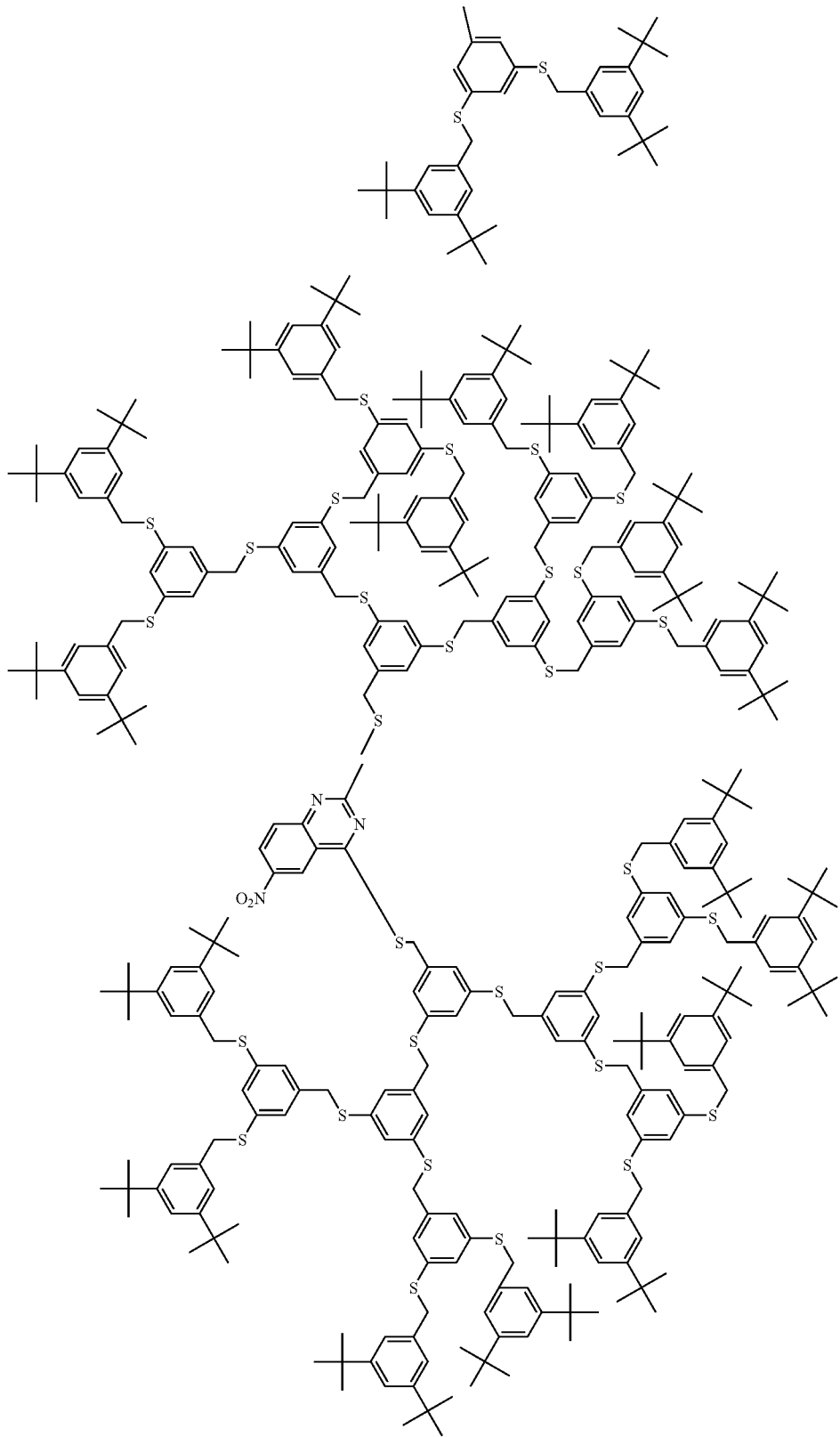

The invention is illustrated in more detail by reference to the following examples. However, the present embodiments are to be considered in all respects as illustrative and not restrictive. Hereunder, the reactions related to the following examples are illustrated in reaction schemes, wherein Ex. means example.
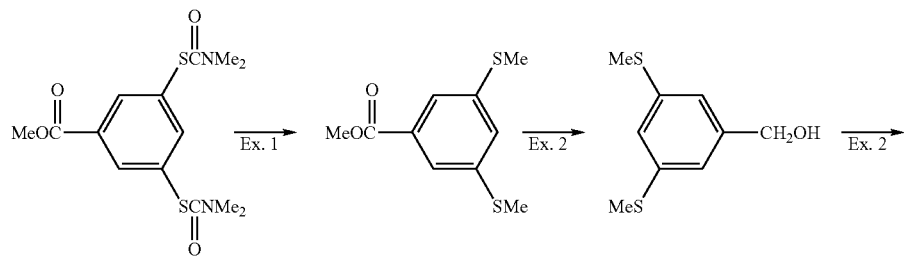
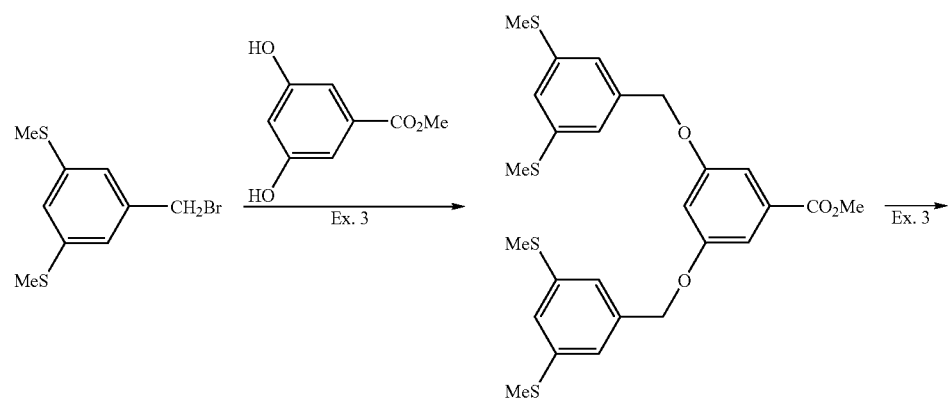
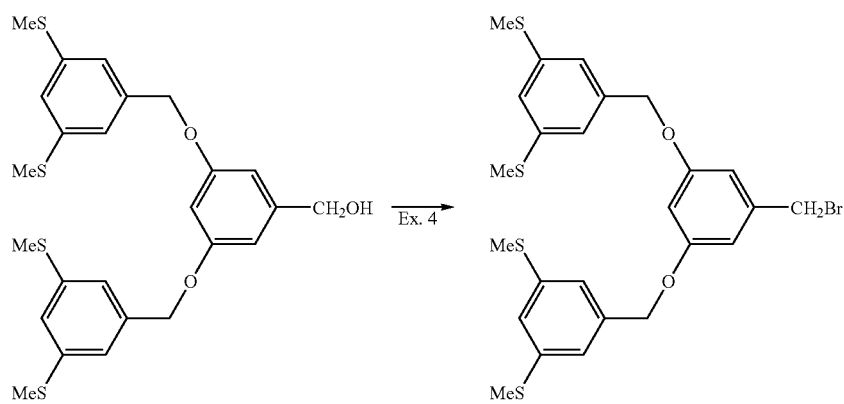
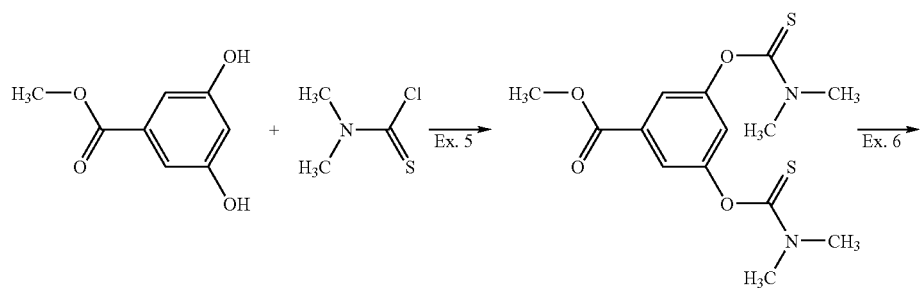

-continued
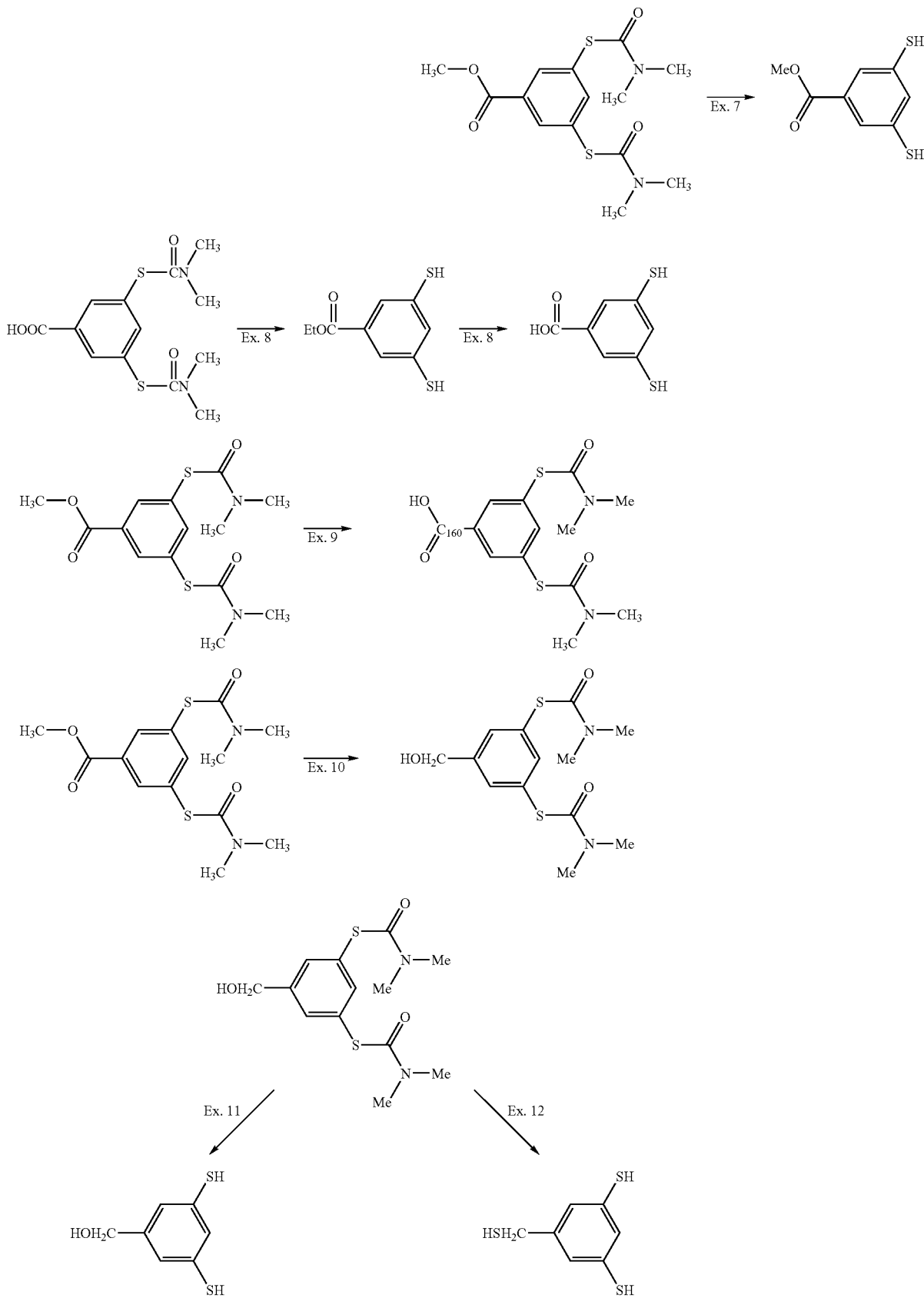

-continued
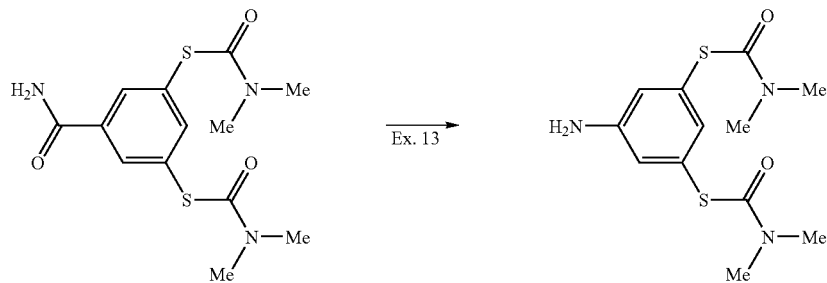
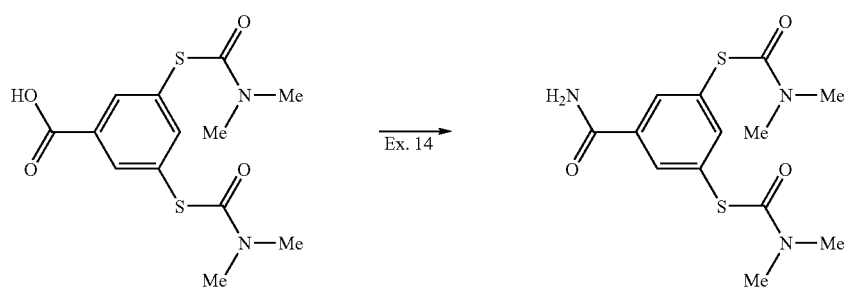
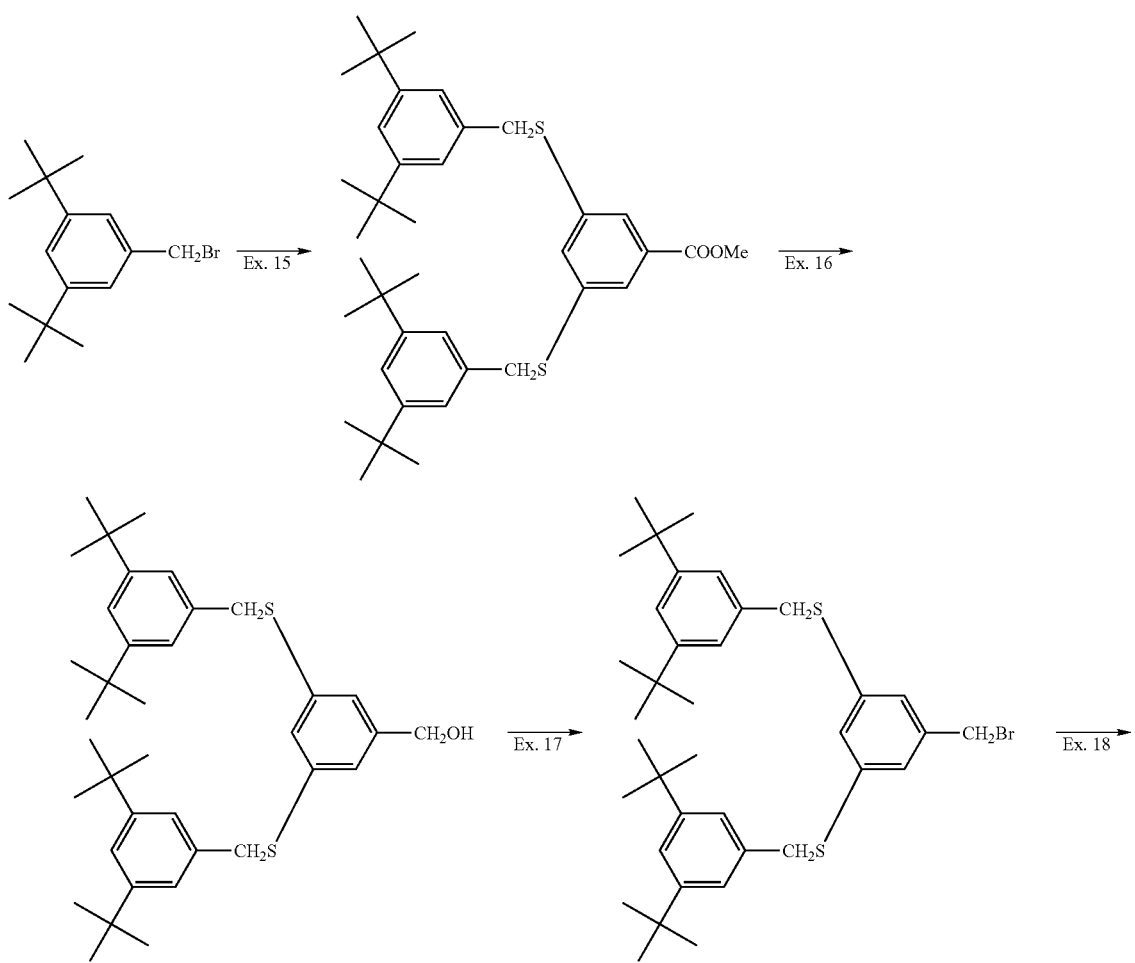

-continued
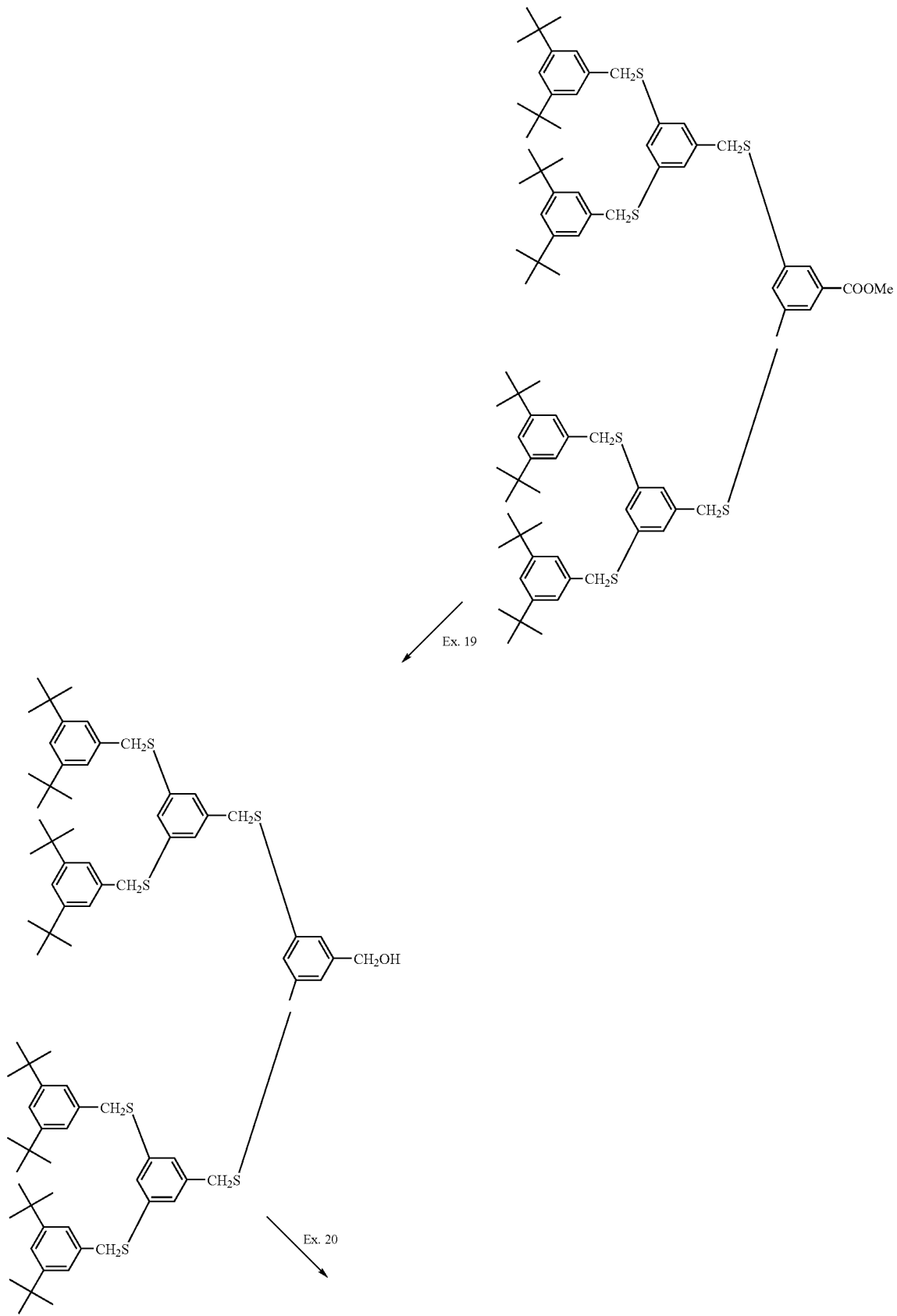

-continued
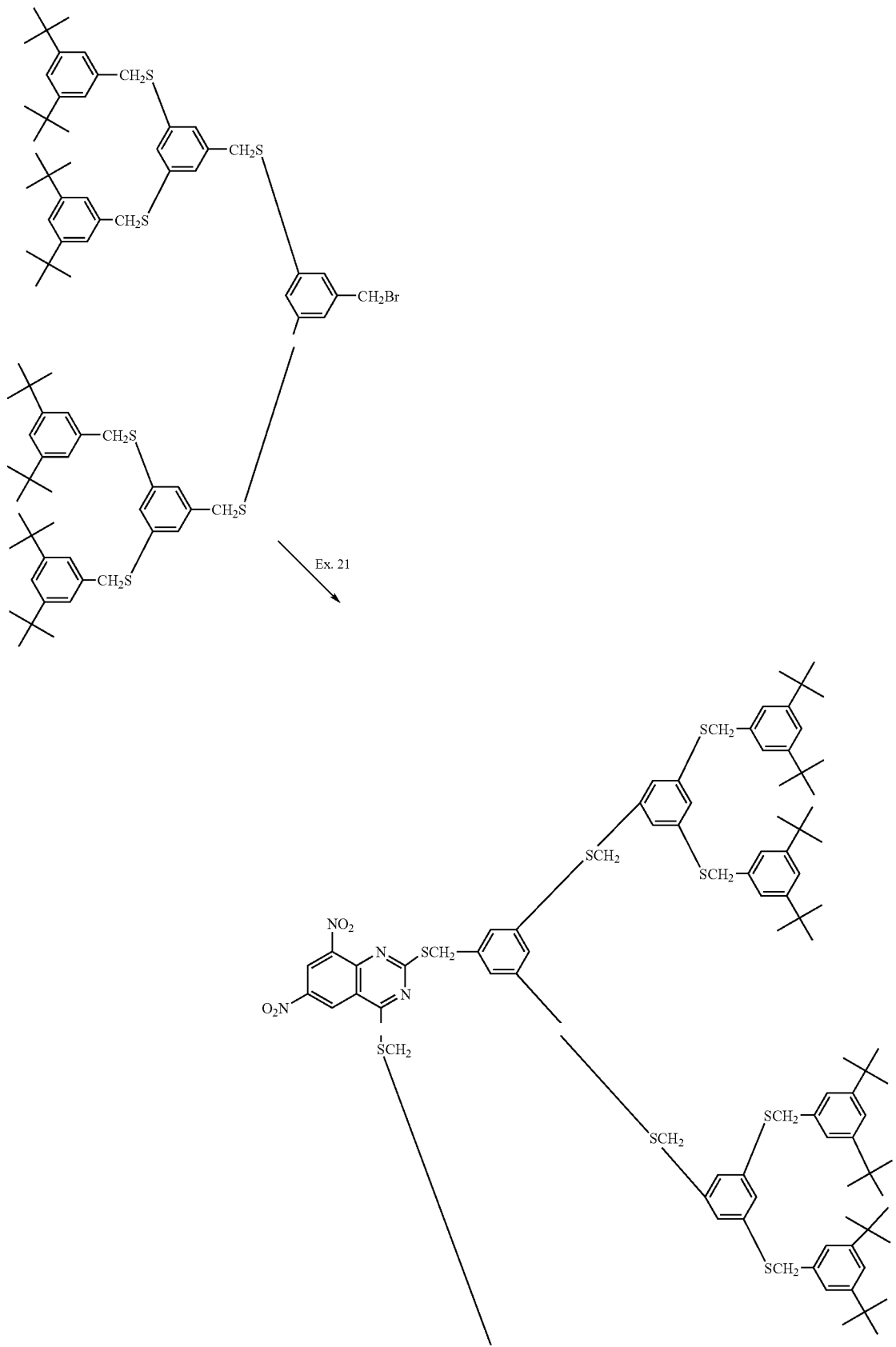

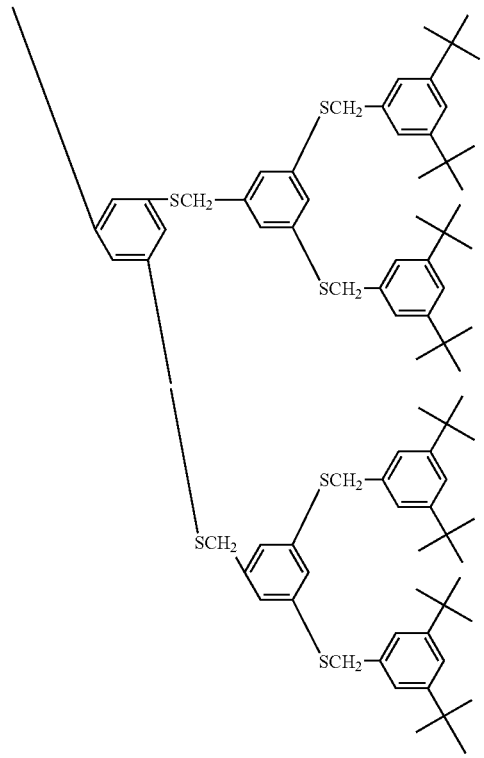
By the same method, following compounds are produced.
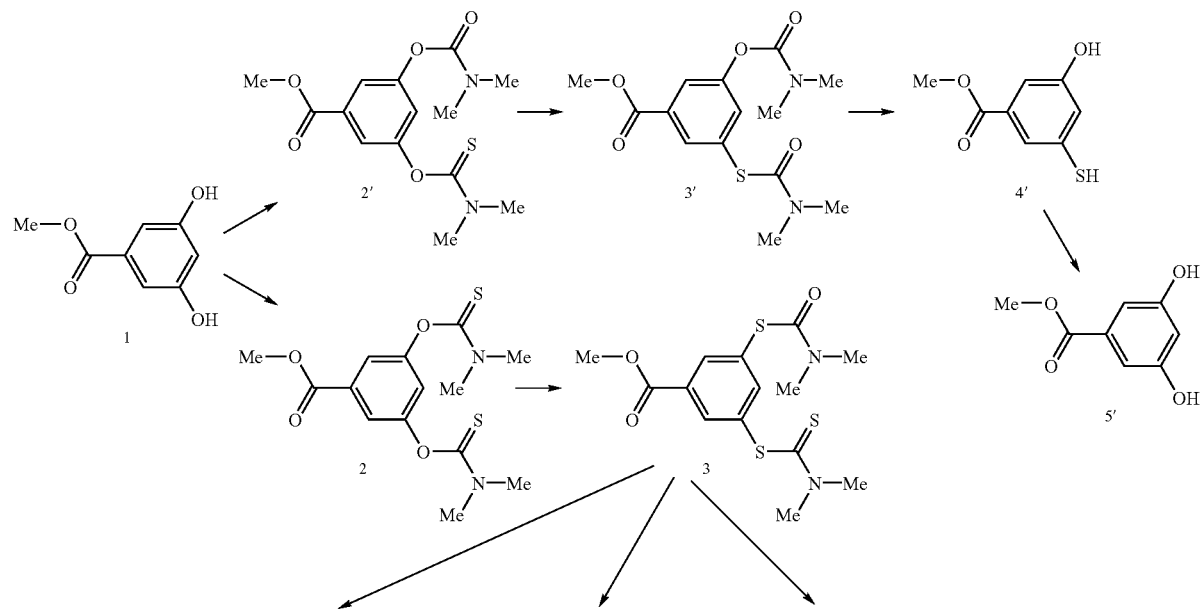

-continued
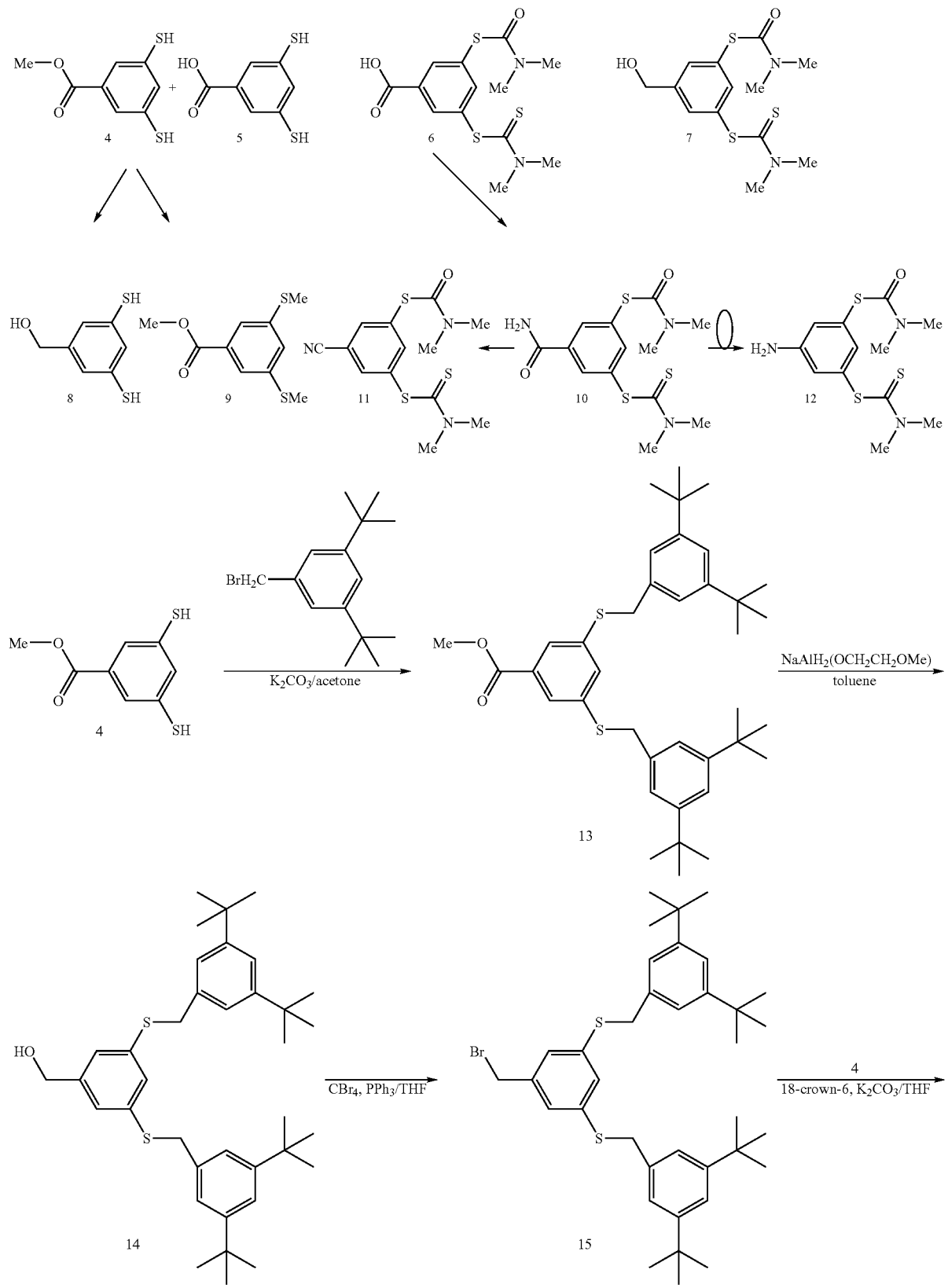

-continued
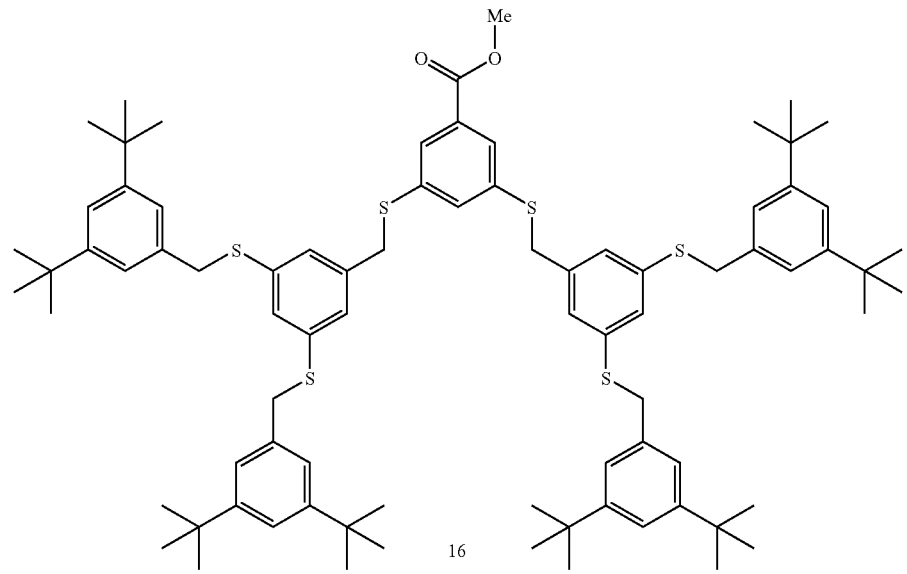
16
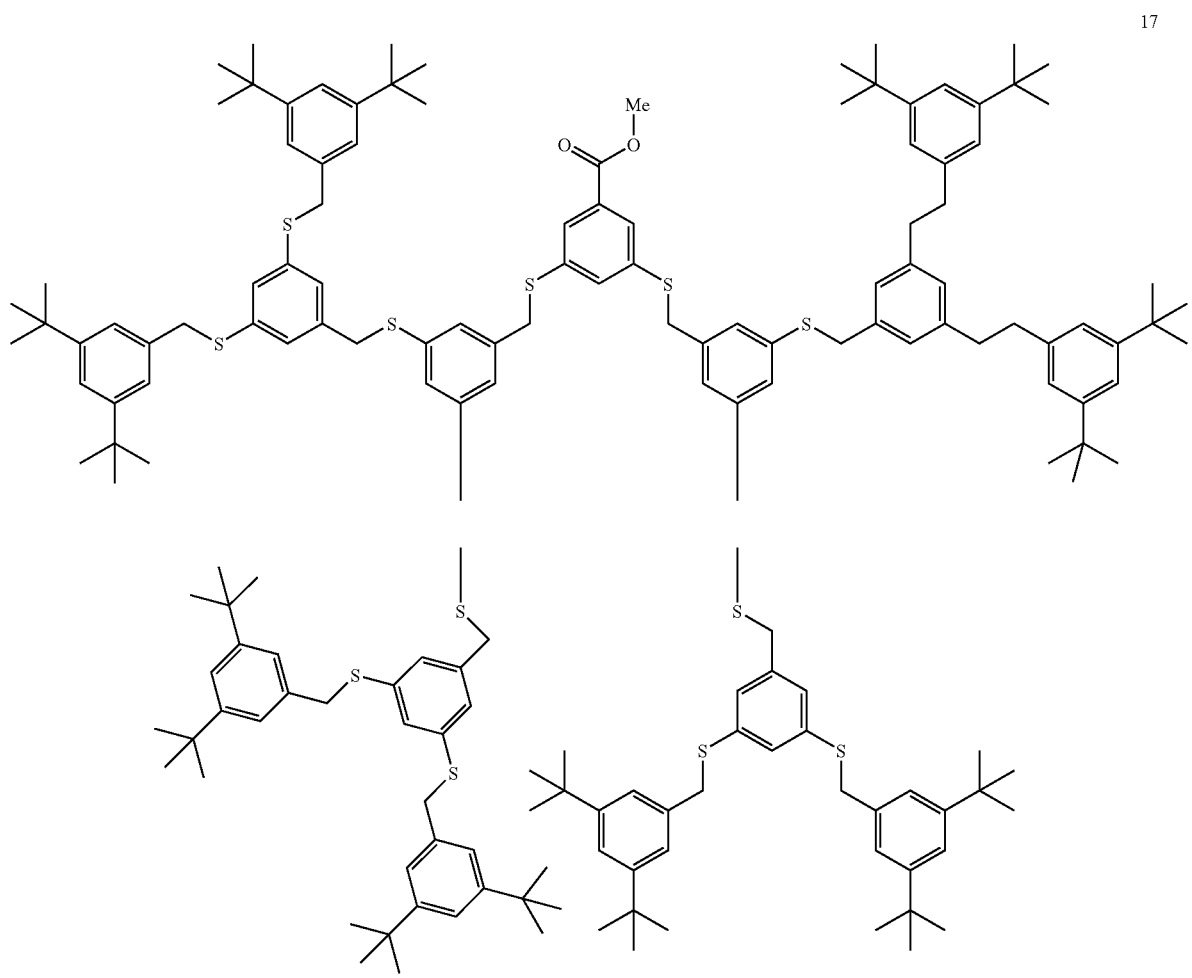
17

-continued
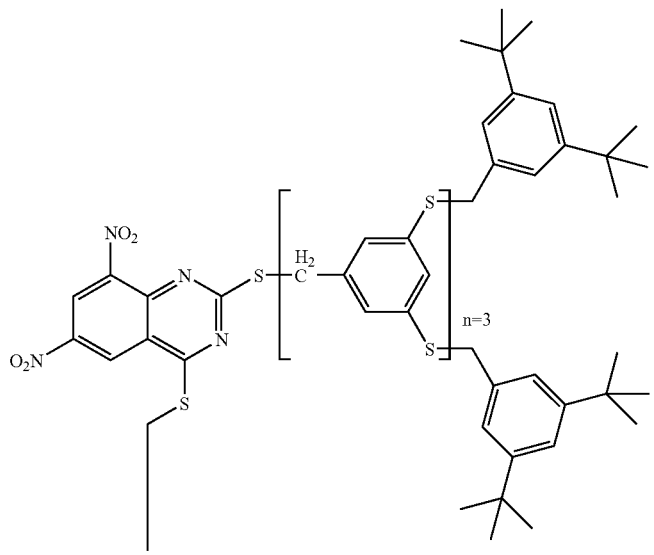
18
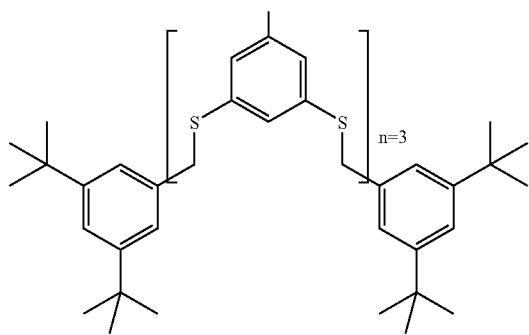
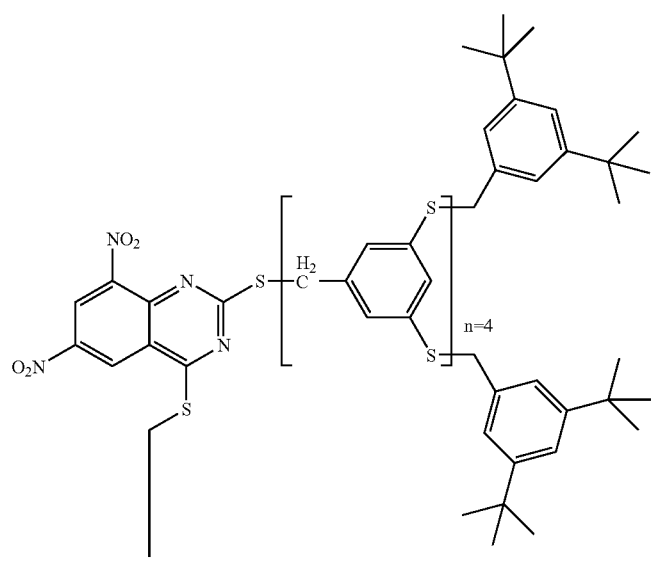
19

-continued
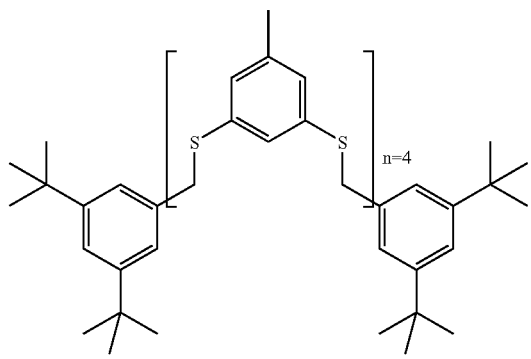
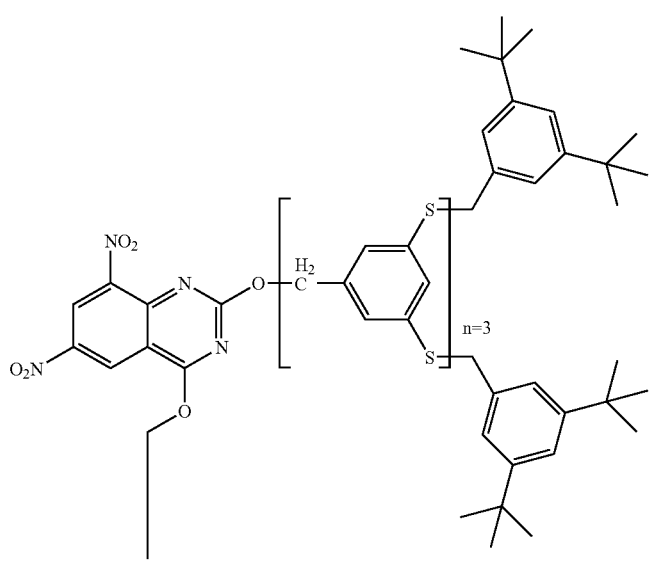
20
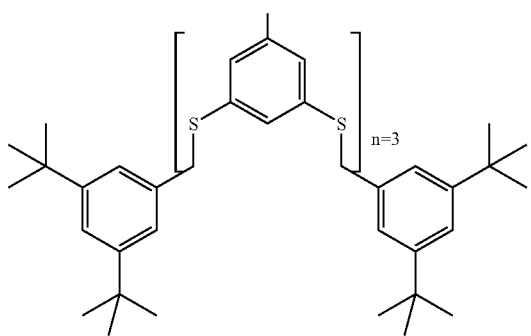

-continued
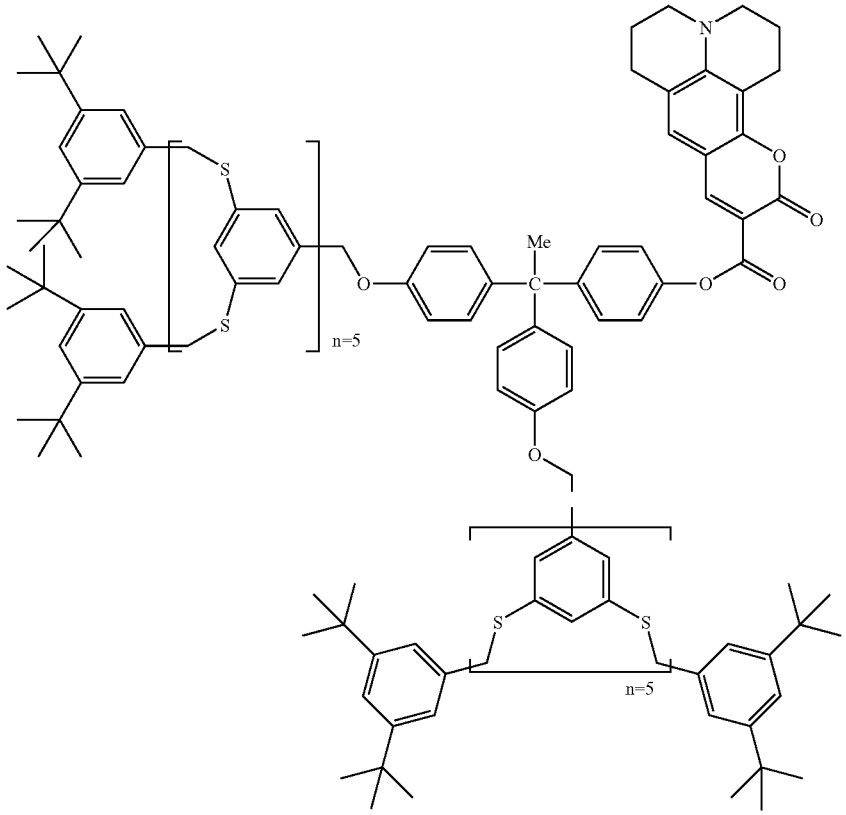
21
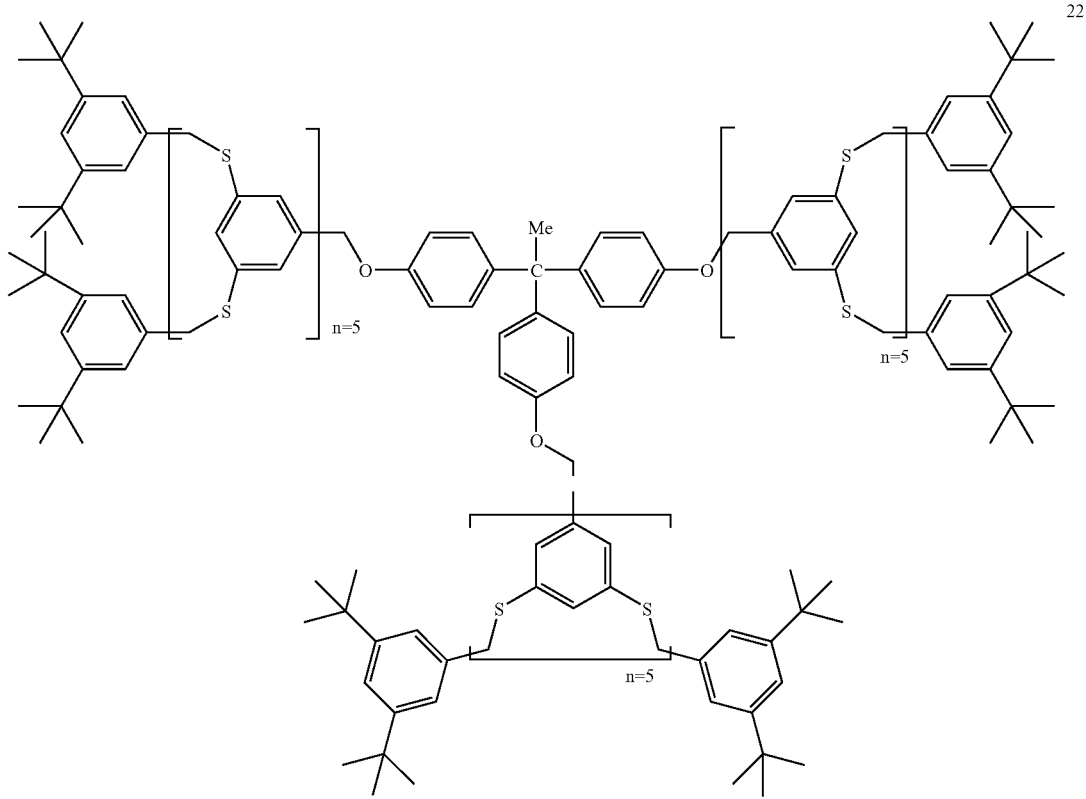
22

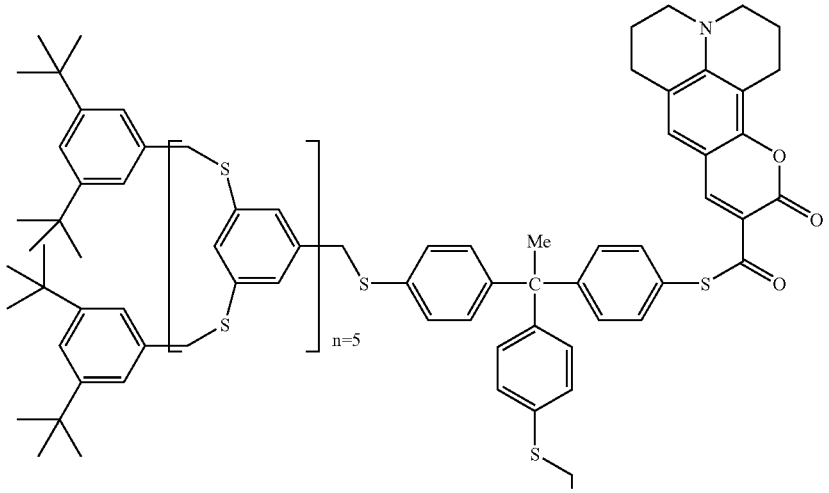
23
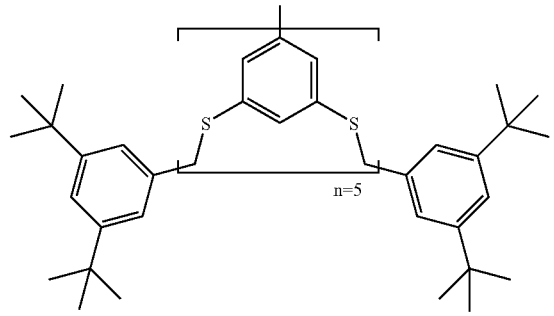
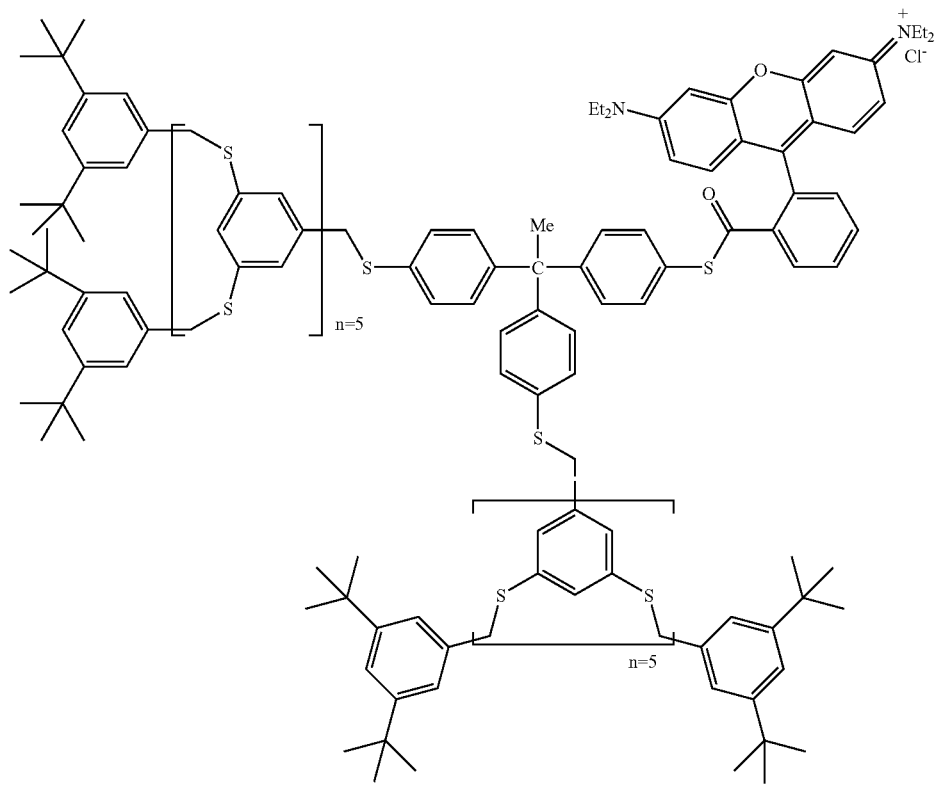
24

The following is a specific explanation of the use of the compounds of the present invention referring to an illustration. FIG. 1 shows a schematic diagram of the layer structure of a single electron tunneling device of the present invention. In the present invention, a single-electron tunneling device is constructed by depositing on a substrate layers 1 of a lower electrode 2, a lower polyimide LB film layer 3, an intermediary electrode layer 4, an upper polyimide LB film layer 5, and an upper electrode 6 layer by layer.

As the material used for the substrate, various materials which are; in general use as the substrate of electronic component, such as metals, glasses, chinaware, ceramics and plastics, and so on, can be used without any particular restriction, and as the material for the lower electrode 2 and upper electrode 6, there can be used thin films of metals such as gold, silver and copper, and so on.

On the lower electrode 2, the lower polyimide LB film layer 3 is deposited. In the present invention, the term "polyimide LB film" means either a monomolecular film of polyimide or a built-up- film thereof, made by the Langmuir-Blodgett technique. In the single electron tunneling device of the present invention, the polyimide LB film layer 3 can be constructed by laminating 13 to 30 monomolecular films.

As the polyimide consisting polyimide LB films, polyimide of a variety of structures can be used. Among them, those which has the repeating structural unit represented by Formula 25 are preferably used, because with them, it becomes possible to control the thickness of the monomolecular film to be prepared. Here, in the preparation of the polyimide LB film layer 3, it is preferable to prepare the layer by first depositing the precursor polyamidic acid monomolecular films and then by performing imidation by means of appropriate chemical processes.

25

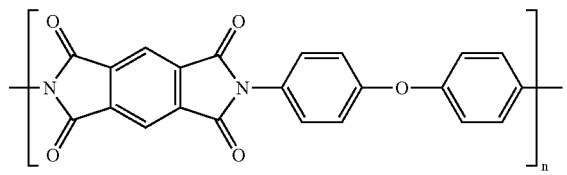

Next, the intermediary electrode layer 4, a monomolecular polyimide LB film layer in which the dendritic molecules of the present invention are incorporated, is formed on the polyimide LB film layer 3. In this case, it is necessary to get the polyimide LB film containing an adequate concentration (0.01 to 1%) of the dendritic molecule of the present invention, in order to make the dendritic molecule function as an intermediary electrode. On the intermediary electrode layer 4, the upper polyimide LB film layer 5 is formed in a manner similar to the formation of the lower polyimide layer 3. This polyimide LB film layer 5 is constructed by depositing 20 to 30 layers of polyimide unimolecular films. By depositing the upper electrode 6 on this upper polyimide LB film layer 5, a single electron tunneling device of the present invention is prepared. Thus, in this single electron tunneling device obtained, all the three layers which construct the electron tunneling layer, namely, the lower polyimide LB film layer 3, upper polyimide LB film layer 5 and the intermediary electrode layer 4, are composed of organic molecular material made of polyimide LB films, which makes it possible for the device to express a good single electron tunneling conductivity characteristic.

Example 1

Production of Methyl 3,5-dimethylthiobenzoate.

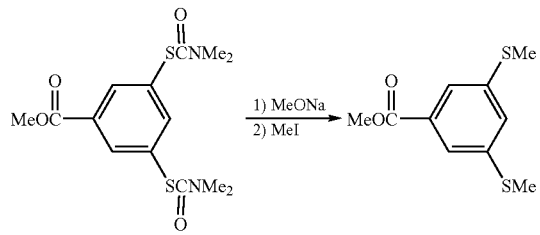

Methyl 3,5-bis(dimethylcarbamoylthio)benzoate (20 g) was dissolved in 500 ml of methanol with heating. To this, sodium methoxide (30 g) was added in an atmosphere of nitrogen. After completion of the addition, the resulting mixture was then heated for one hour under reflux and cooled a little. To this, an excess amount of methyl iodide was added, and the resulting mixture was heated for three hours under reflux and then concentrated under reduced pressure. The residue thus obtained was purified by means of chromatography with chloroform, giving the objective compound. The yield was 10.5 g (79.3%). The melting point is 46° C.

$^1$H-NMR (δ ppm, CDCl$_3$, TMS): 2.5 (6H, s), 3.9 (3H, s), 7.2 (1H, s), 7.6 (2H, s).

Example 2

Production of 3,5-Dimethylthiobenzyl Bromide via 3,5-Dimethylthiobenzyl Alcohol

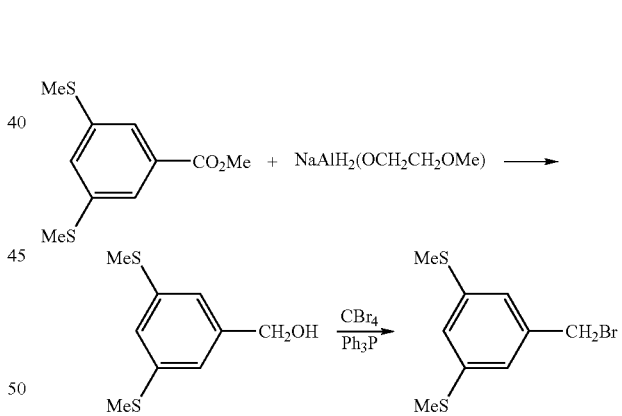

In an atmosphere of nitrogen, sodium dihydrobis(2-methoxyethoxy)aluminate (70% in toluene, 50 g, 0.17 mol) was dissolved into dry tetrahydrofuran. To this, a solution of 22.8 g of 3,5-dimethylthiobenzoate in 100 ml tetrahydrofuran was added dropwise at 5 to 10° C., and the mixture obtained was stirred at the same temperatures for 6 hours. Then, the reaction mixture was added to a mixture of 50 ml of concentrated hydrochloric acid and 1L of ice-water, followed by extraction with chloroform. The extract was purified by means of chromatography using chloroform as the developing solvent. The eluate was then evaporated to dryness under reduced pressure and the residue obtained was washed with petroleum ether, giving 3,5-dimethylthiobenzyl bromide. The yield was 21.6 g (82%). The melting point is 76–77° C.

Example 3

Production of 3,5-Bis(3,5-dimethylthiobenzyloxy)benzyl Alcohol via Methyl 3,5-Bis-(3,5-dimethylthiobenzyloxy)benzoate

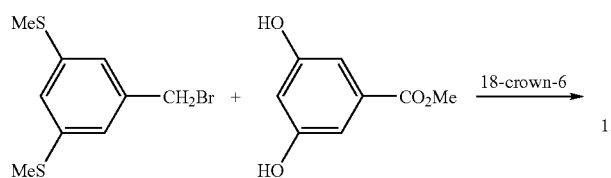

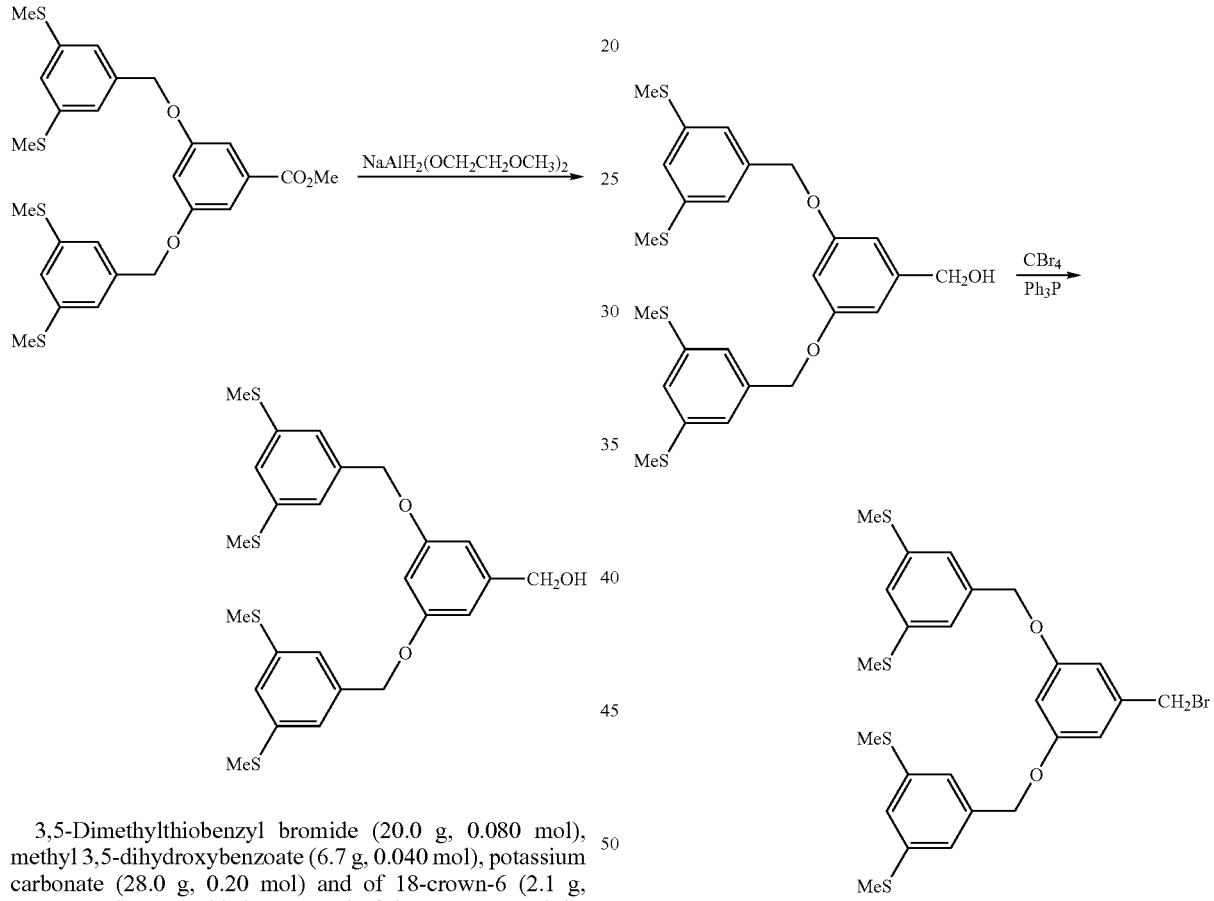

3,5-Dimethylthiobenzyl bromide (20.0 g, 0.080 mol), methyl 3,5-dihydroxybenzoate (6.7 g, 0.040 mol), potassium carbonate (28.0 g, 0.20 mol) and of 18-crown-6 (2.1 g, 0.0080 mol) were added to 500 ml of dry acetone, and the resulting mixture was heated for 15 hours under reflux in an atmosphere of nitrogen. The reaction mixture was then filtered to remove insolubles and the filtrate was evaporated to dryness under reduced pressure. The residue was purified by means of chromatography using chloroform as the developing solvent, and the eluate was concentrated under reduced pressure, giving methyl 3,5-bis(3,5-dimethylthiobenzyloxy)benzoate. The yield was 21.0 g (98.9%). The melting point is 121–122° C.

$^1$H-NMR (δ ppm, CDCl$_3$, TMS): 2.4 (12H, s), 3.8 (3H, s), 4.9 (4H, s), 6.3–7.2 (9H, m)

To sodium dihydrobis(2-methoxyethoxy)aluminate (70% in toluene, 22.7 g, 0.078 mol), was added dropwise a solution of methyl 3,5-bis(3,5-dimethylthiobenzyloxy)benzoate (21.0 g) in tetrahydrofuran (180 ml) in a stream of nitrogen at 5–10° C. during 30 minutes. After completion of the addition, the mixture was stirred for 5 hours and then poured into 2 L of diluted hydrochloric acid, followed by extraction with 1 L of chloroform. The extract was evaporated to dryness, and the residue was purified by means of chromatography using chloroform as the developing solvent, giving 3,5-bis(3,5-dimethylthiobenzyloxy)benzyl alcohol. The yield was 17.5 g (85.6%).

$^1$H-NMR(δ ppm, CDCl$_3$, TMS): 2.4 (12H, s), 4.6 (2H, s), 4.9 (4H, s), 6.5–7.0 (9H, m)

Example 4

Production of 3,5-Bis(3,5-dimethylthiobenzyloxy)benzyl Bromide 3,5-Bis-(3,5-dimethylthiobenzyloxy)benzyl alcohol (17.0 g, 0.033 mol) and carbon tetrabromide (14.2 g, 0.0043 mol) were dissolved in 100 ml of tetrahydrofuran. To this, triphenylphosphine (11.3 g, 0.043 mol) was added portionwise. at the temperature of 1.0 to 10° C. After completion of the addition, the mixture was stirred for 7 hours keeping the mixture at the same temperature. Then, the reaction mixture was poured into 300 ml of ice-water and the resulting mixture was extracted with chloroform. The extract was purified by means of chromatography, giving 7.0 g of 3,5-bis(3,5-dimethylthiobenzyloxy)benzyl bromide $^1$H-NMR(δ ppm, CDCl$_3$, TMS): 2.4 (12H, s), 4.4 (2H, s), 4.9 (4H, s), 6.5–7.1 (9H, m)

Example 5

Production of Methyl 3,5-Bis(dimethylthiocarbamoyloxy)benzoate

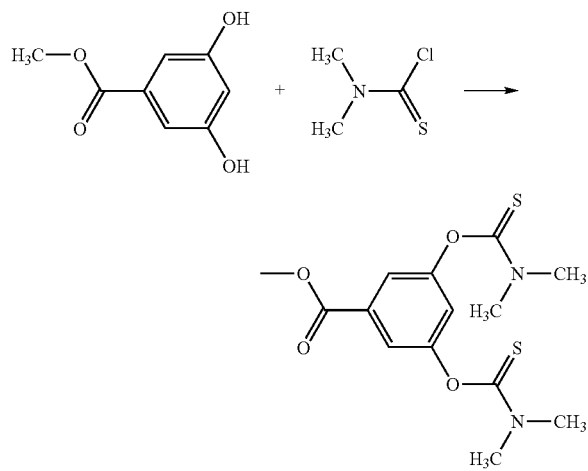

In a 5 L round bottomed flask equipped with a stirrer, were placed methyl 3,5-dihydroxybenzoate. (168.2 g, 1.000 mol), dimethylcarbamoyl chloride (280.4 g, 2.20 mol, 97% pure), potassium carbonate (300 g, 2.17 mol) and acetone (3000 ml), and the mixture was reacted at 40–50° C. with stirring. The acetone was removed by concentrating the reaction mixture under reduced pressure. Upon addition of excess amount of water to the residue and upon cooling, methyl 3,5-bis(dimethylthiocarbamoyloxy)benzoate was obtained as colorless crystals, which were recrystallized from ethanol, giving 297.5 g (87%) of the pure compound as needles. The melting point is 132–133° C.

$^1$H-NMR(CDCl$_3$): 3.34 (6H, s, Me×2), 3.44 (6H, s, Me×2), 3.90 (3H, s, Me), 7.05–7.09 (1H, m, ph-H), 7.64–7.67 (2H, s, ph-H)

[Me stands for CH$_3$, and ph stands for phenyl (the same hereinbefore and hereinafter, throughout this specification).]

Example 6

Production of Methyl 3,5-Bis(dimethylcarbamoylthio)benzoate

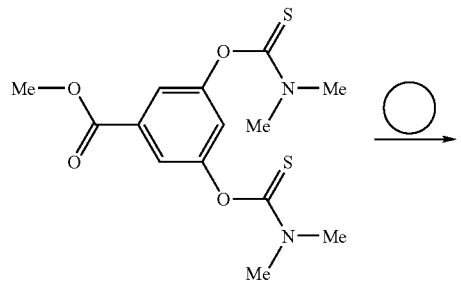

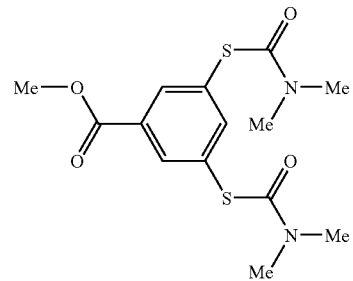

Methyl 3,5-bis(dimethylthiocarbamoyloxy)benzoate (297.0 g, 0.867 mol) was added with stirring to 1,3-imidazolidinone (1000 ml) while keeping the temperature at 210–213° C. After heating under reflux for 3 hours, the 1,3-imidazolidinone was distilled off, giving a viscous liquid. To this, ethyl acetate (1000 ml) was added, and the mixture was washed with a cold 5% sodium hydroxide solution (300 ml) and with a saturated sodium chloride solution (300 ml), and then dried over magnesium sulfate.

After removing the ethyl acetate by means of distillation, the residue was recrystallized from toluene (500 ml), giving 219 g (74%) of methyl 3,5-bis(dimethylcarbamoylthio)benzoate as colorless needles. The melting point is 128–130° C.

$^1$H-NMR(CDCl$_3$): 3.05 (12H, s, Me×4), 3.90 (3H, s, Me), 7.82 (1H, s, ph-H), 8.17 (2H, s, ph-H)

Example 7

Production of Methyl 3,5-Dimercaptobenzoate

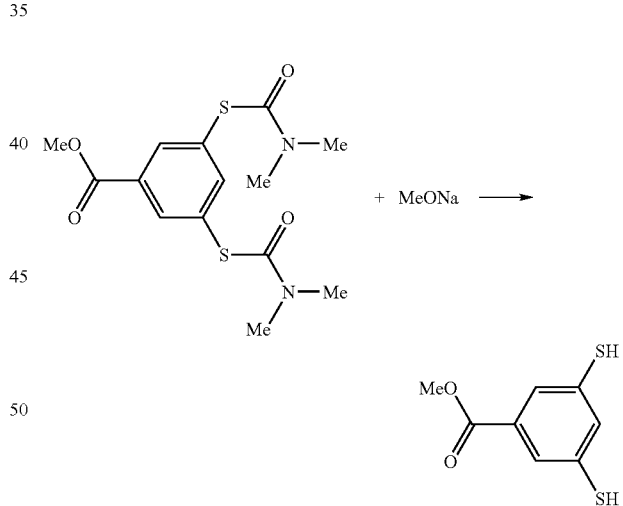

Methyl 3,5-bis(dimethylcarbamoylthio)benzoate (34.2 g, 0.100 mol) was made to react with a mixture of 43 g of 28% methanol solution of sodium methoxide (0.223 mol) and methanol (150 ml) at 22–25° C. After addition of 500 ml of ice-water, the reaction mixture was neutralized with concentrated hydrochloric acid to give a colorless crystals. The crystals thus obtained were purified by means of recrystallization from methanol giving 12.5 g (62.5%) of methyl 3,5-dimercaptobenzoate as a colorless powder. The melting point is 61–62° C.

$^1$H-NMR(CDCl$_3$): 3.51 (2H, s, SH×4), 3.87 (3H, s, Me), 7.30 (1H, t, J=0.1 Hz, ph-H), 6.67 (2H, d, J=0.1 Hz, ph-H)

Example 8

Production of Ethyl 3,5-Dimercaptobenzoate

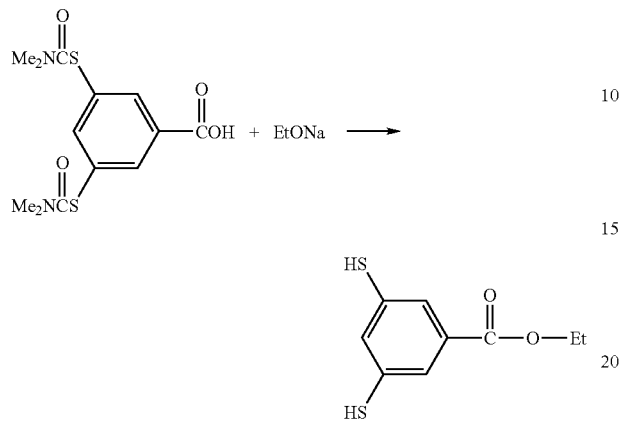

(wherein Et stands for ethyl. The same hereinafter.)

The reaction shown above was carried out according to the ordinary method of esterification, yielding ethyl 3,5-dimercaptobenzoate. The melting point is 49–51° C.

$^1$H-NMR(CDCl$_3$): 1.36 (3H, t, J=0.02 Hz, Me), 3.51 (2H, s, SH×2), 4.33 (2H, q, CH2), 7.31 (1H, s, ph-H), 7.68 (2H, s, ph-H)

In addition, the corresponding free carboxylic acid, 3,5-dimercaptobenzoic acid was prepared according to the method described in Boiko, V. N.; Shchupak, G. M.; Yagupol'skii, L. M., Zh. Org. Khim., (1985), 21(7), 1470–1477.

Example 9

3,5-Bis(dimethylcarbamoylthio)benzoic acid

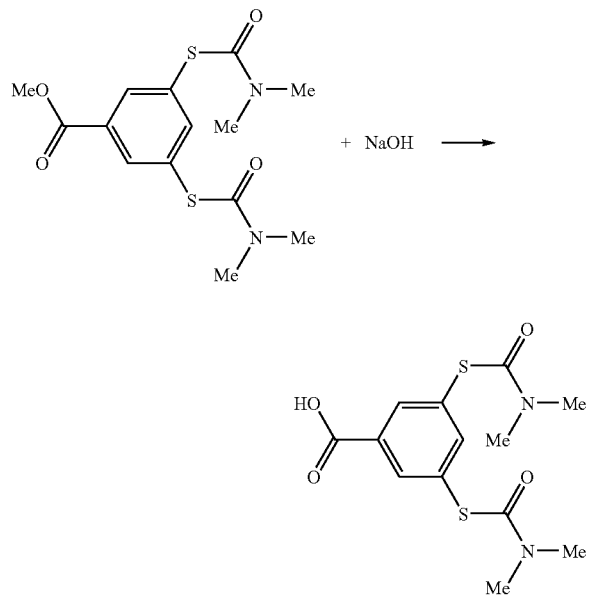

Methyl 3,5-bis(dimethylcarbamoylthio)benzoate (3.42 g, 10 mmol) was made to react with 5% aqueous sodium hydroxide solution (10 ml. 12.5 mmol) for 3 hours at 22–25° C. with stirring. After cooling by the addition of 50 ml of ice-water, the reaction mixture was extracted with ethyl acetate (300 ml×3) and the extract was dried over magnesium sulfate. The ethyl acetate was evaporated under reduced pressure and the colorless crystals thus obtained was recrystallized from ethanol to give 2.86 g (87.2%) of 3,5-bis(dimethylcarbamoylthio)benzoic acid as colorless needles. The melting point is 196–198° C. (with decomposition).

$^1$H-NMR(DMSO-d$_6$): 2.96 (6H, s, Me×2), 3.03 (6H, s, Me×2), 7.82 (1H, s, ph-H), 7.88 (1H, s, ph-H), 8.10 (1H, s, ph-H), 10.5 (1H, br-s, OH).

Example 10

3,5-Bis(dimethylcarbamoylthio)benzyl Alcohol

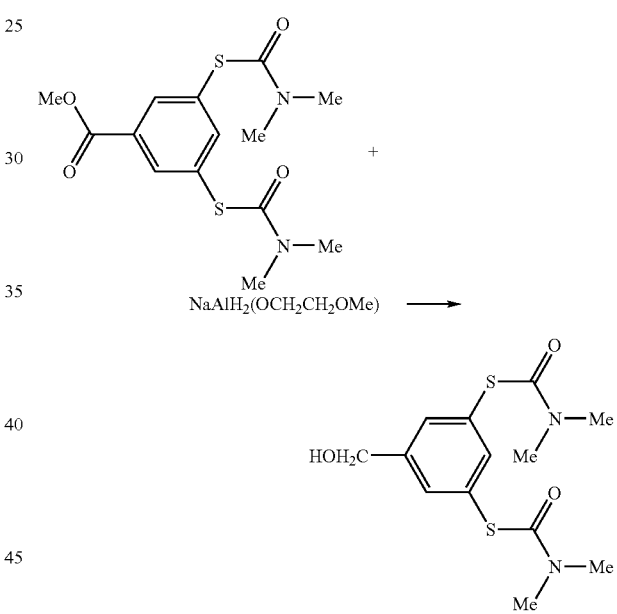

A solution of methyl 3,5-bis(dimethylcarbamoylthio)benzoate (3.42 g, 10 mmol) in 20 ml of toluene was added to sodium dihydrobis(2-methoxyethoxy)aluminate (70% in toluene, 8.7 g, 30.1 mmol) at the temperature of 15–30° C., and the mixture was heated under reflux with stirring. The reaction mixture was cooled by the addition of 50 ml of ice-water containing 10 ml of concentrated sulfuric acid, followed by extraction with ethyl acetate (30 ml×3). The extract was dried over magnesium sulfate. The ethyl acetate was removed by distillation under reduced pressure, yielding 2.54 g of a colorless oil. This product was then purified by the method of chromatography using chloroform as the developing solvent, giving 3,5-bis(dimethylcarbamoylthio) benzyl alcohol (1.21 g, 38.5%) as a colorless oil.

$^1$H-NMR(CDCl$_3$): 2.90 (6H, s, Me×2), 2.94 (6H, s, Me×2), 4.50 (2H, s, CH$_2$), 7.38 (2H, s, ph-H), 7.44 (1H, s, ph-H).

Example 11

Production of 3,5-Dimercaptobenzyl Alcohol

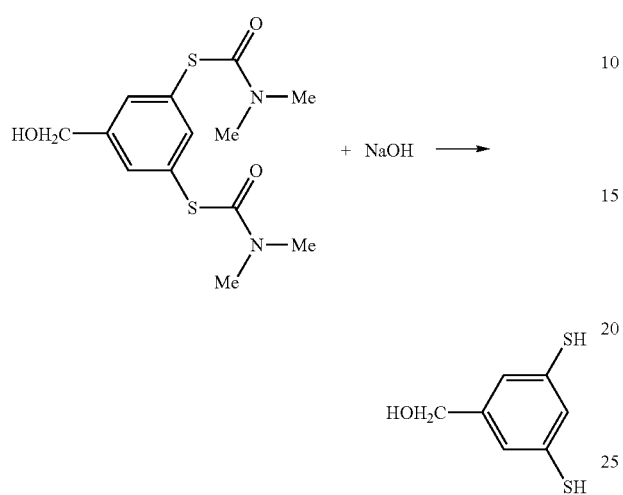

3,5-Bis(dicarbamoylthio)benzyl alcohol was hydrolyzed by the ordinary method of hydrolysis using sodium hydroxide, giving 3,5-dimercaptobenzyl alcohol.

Example 12

Production of 3,5-Dimercaptobenzyl Mercaptan

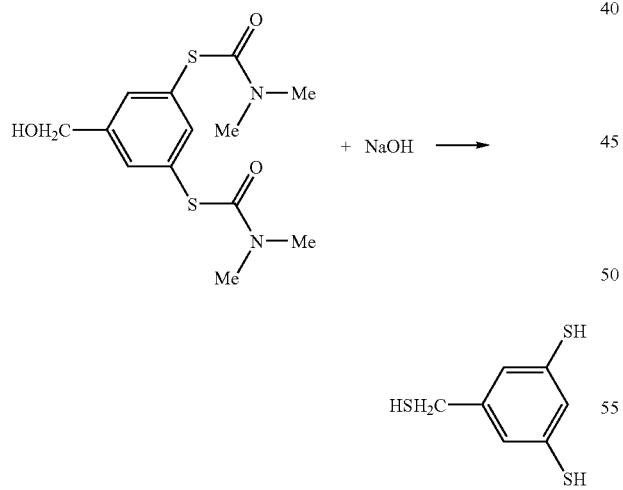

3,5-Bis(dimethylcarbamoylthio)benzyl alcohol was treated with sodium hydroxide according to the ordinary method to give 3,5-dimercaptobenzyl alcohol. This alcohol was then brominated in a manner similar to that in EXAMPLE 17, giving 3,5-dimercaptobenzyl bromide, followed by the reaction with urea according to the ordinary method giving 3,5-dimercaptobenzyl mercaptan.

Example 13

Production of 3,5-Bis(dimethylcarbamoylthio)aniline

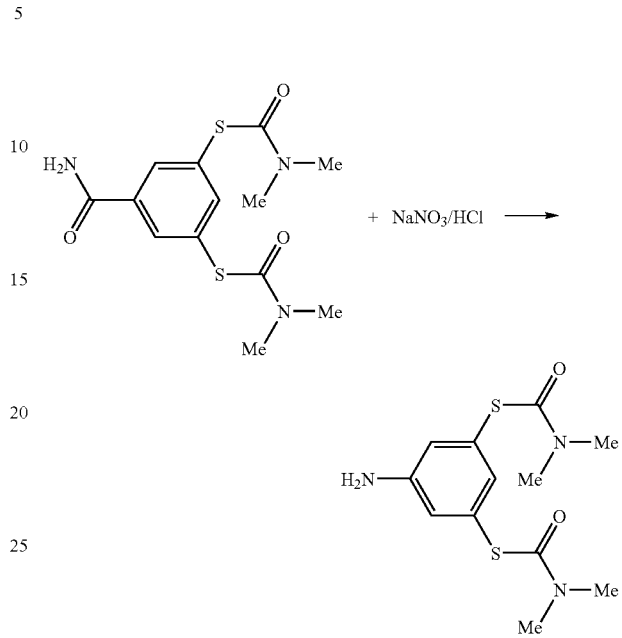

3,5-Bis(dimethylcarbamoylthio)benzamide was made to react with $NaNO_3/HCl$ according to the ordinary method, giving 3,5-bis(dimethylcarbamoylthio)aniline.

Example 14

Production of 3,5-Bis(dimethylcarbamoylthio)benzamide

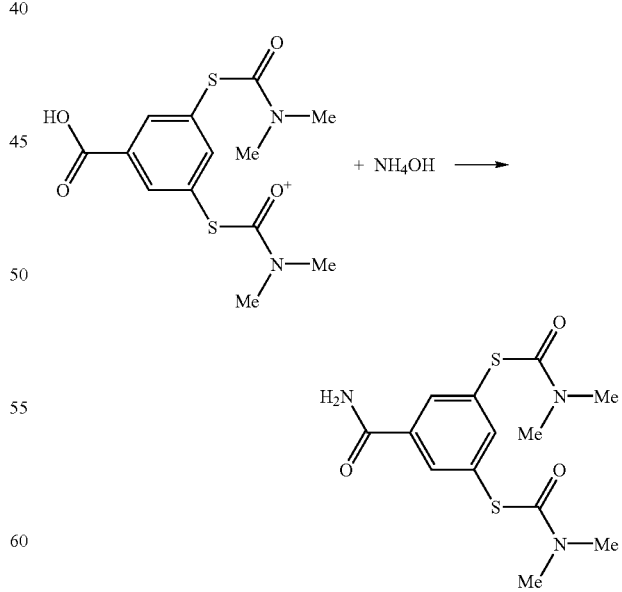

3,5-Bis(dimethylcarbamoylthio)benzoic acid (3.28 g, 10 mmol) and thionyl chloride (30 mmol) were added to 30 ml of toluene and the resulting mixture was heated under reflux for 2 hours. After removal of the excess thionyl chloride and the toluene, the residue was poured into an ammonia-ethanol solution (10%, 10 ml), giving 3,5-bis(dimethylcarbamoylthio)benzamide as colorless crystals. The melting point is 264–265° C.

Example 15

Production of Methyl 3,5-Bis(3,5-di-tertiary-butylbenzylthio)benzoate

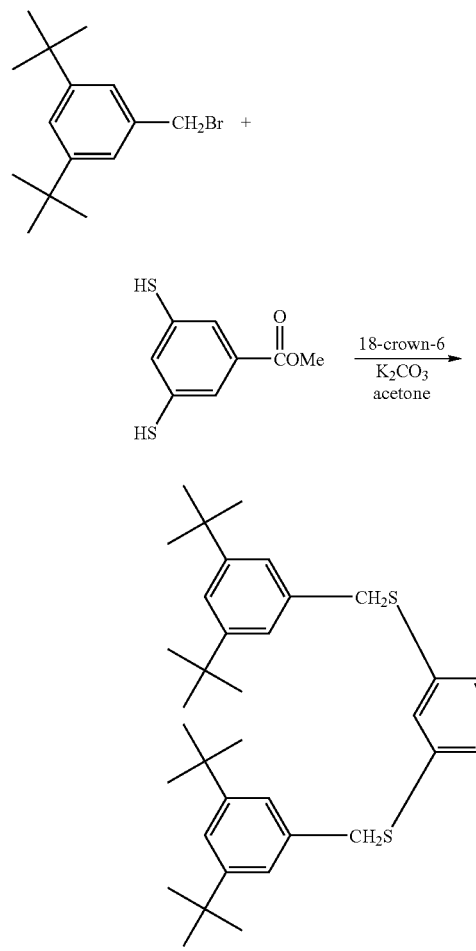

Methyl 3,5-dimercaptobenzoate (20.0 g, 100.0 mmol), 3,5-di-tertiary-butylbenzyl bromide (57.0 g, 201.2 mmol), 0.3 g of 18-crown-6 (manufactured by Wako Pure Chemicals, Co. Ltd.) and potassium carbonate (28.0 g, 202.6 mmol) were added to 350 ml of acetone and the mixture was heated under reflux for 12 hours. After completion of the reaction and removal of insoluble salts and acetone, the residue was purified by the method of column chromatography with n-hexane:dichloromethane=1:1, giving 53.0 g of the objective 3,5-bis(3,5-di-tertiary-butylbenzylthio)benzoate as colorless needles. The melting point is 102–103° C.

$^1$H-NMR(CDCl$_3$): 1.29 (36H, s, tert-Bu-H), 3.70 (3H, s, Me), 3.90 (4H, s, SCH$_2$), 7.10 (4H, s, ph-H), 7.29 (3H, br-s, ph-H), 7.77 (12H, s, ph-H).

Example 16

Production of 3,5-Bis(3,5-di-tertiary-butylbenzylthio)benzyl Alcohol

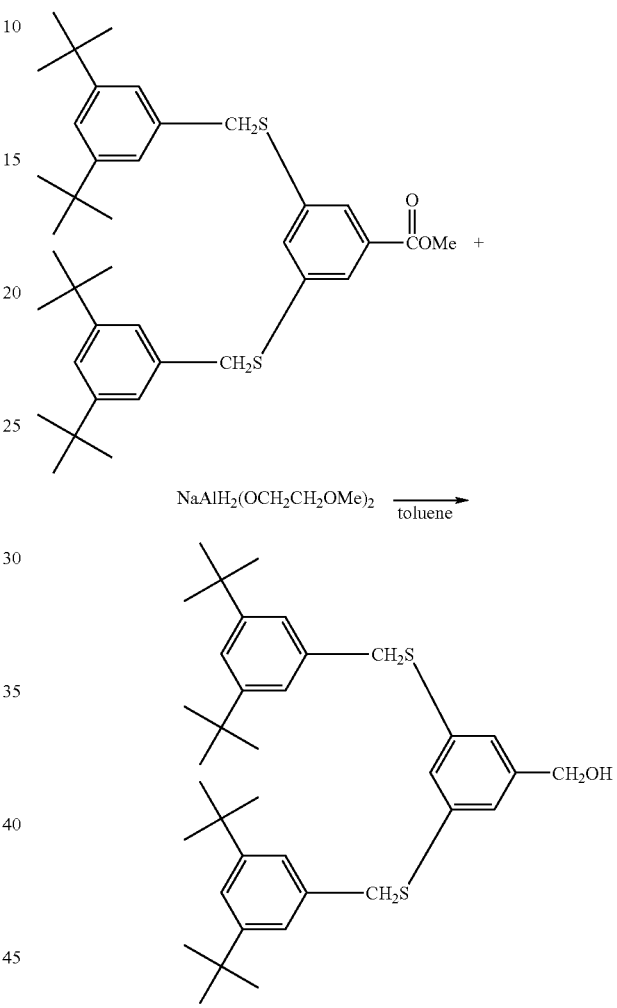

Methyl 3,5-bis(3,5-di-tertiary-butylbenzylthio)benzoate (52.0 g, 86.0 mmol) was dissolved in 300 ml of toluene. To this, was added dropwise a 70% solution of sodium dihydrobis(2-methoxyethoxy)aluminate in toluene (52 g, 180.0 mmol), maintaining the temperature at 35° C. or below and the resulting mixture was stirred for 2 hours under the same conditions. After completion of the reaction, the reaction mixture was poured into 500 ml of a cold 10% hydrochloric acid solution, followed by stirring for 10 minutes. The toluene layer was separated, dried over anhydrous magnesium sulfate and then concentrated. The resulting residue was then purified by means of chromatography with dichloromethane, giving 4.96 g of 3,5-bis(3,5-di-tertiary-butylbenzylthio)benzyl alcohol as a viscous substance.

$^1$H-NMR(CDCl$_3$): 1.42 (36H, s, tert-Bu-H), 4.18 (4H, s, S—CH$_2$), 4.67 (2H, s, CH$_2$O), 7.23–7.26 (7H, m, ph-H), 7.42 (2H, s, ph-H)

Example 17

Production of 3,5-Bis(3,5-di-tertiary-butylbenzylthio)benzyl Bromide

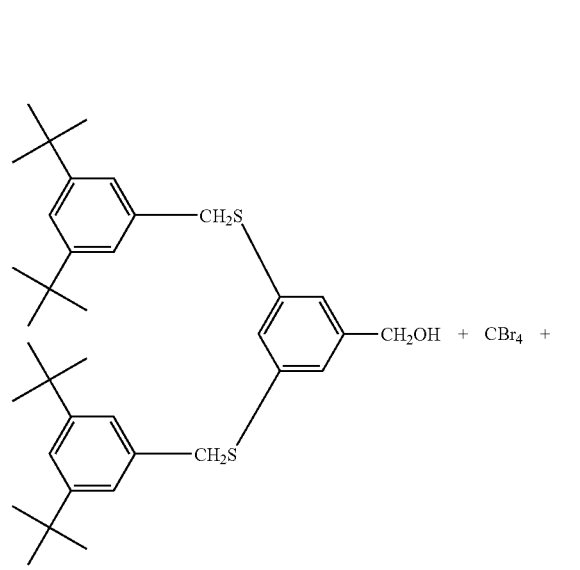

3,5-Bis(3,5-di-tertiary-butylbenzylthio)benzyl alcohol (49.0 g, 84.9 mmol) and carbon tetrabromide (28.2 g, 85.0 mmol) were dissolved in 300 ml of tetrahydrofuran. To this solution was added with stirring triphenylphosphin (23.5 g, 89.6 mmol), at the temperatures of 10° C. or below. The reaction mixture became clear once, and then colorless crystals separated gradually. After stirring overnight at 25–30° C., the crystals were removed by filtration and the filtrate was concentrated. The residue obtained was purified by means of chromatography with n-hexane:dichloromethane=1:1, giving 34.8 g of 3,5-bis(3,5-di-tertiary-butylbenzylthio)benzyl bromide.

$^1$H-NMR(CDCl$_3$): 1.43 (36H, s, tert-Bu-H), 4.18 (4H, s, SCH$_2$), 4.44 (2H, s, CH$_2$Br), 7.23–7.25 (7H, m, ph-H), 7.43 (2H, s, ph-H).

Example 18

Production of Dendrimer I

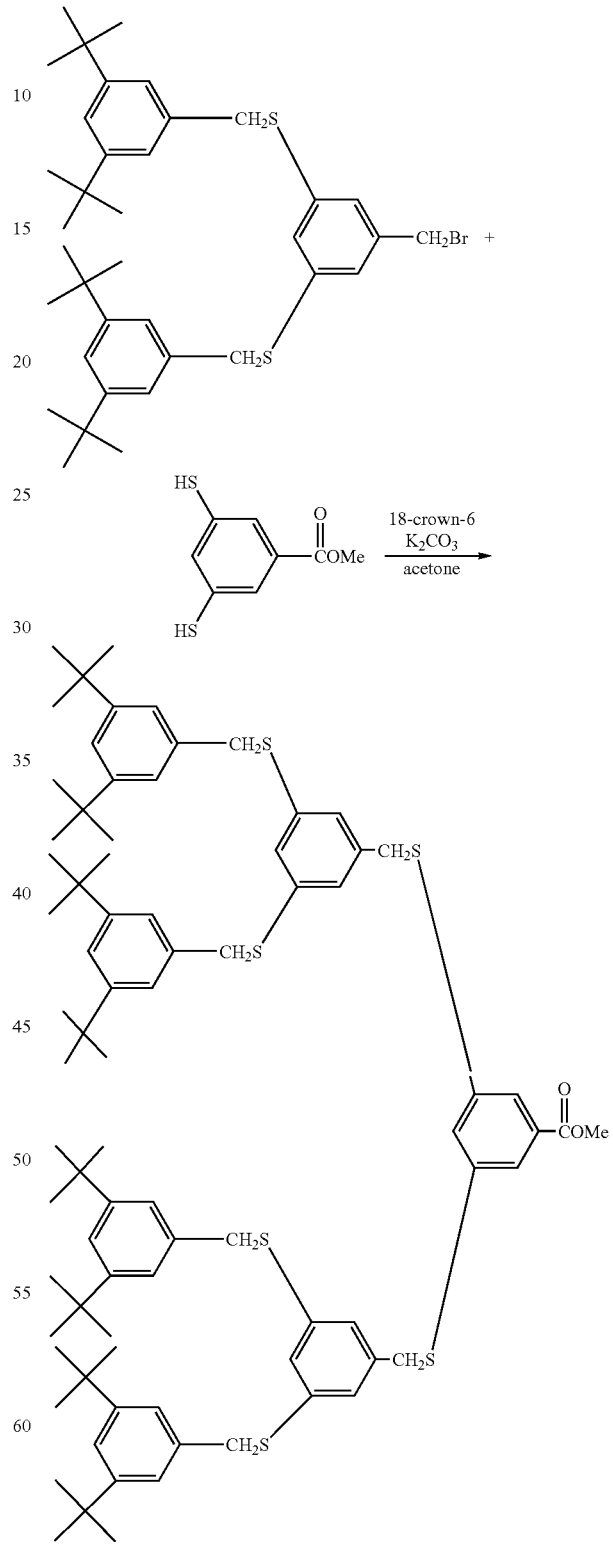

Dendrimer I 3,5-Bis(3,5-di-tertiary-butylbenzylthio)benzyl bromide (34.0 g, 53.1 mmol) was made to react in a manner similar to that in EXAMPLE 15, giving 21.0 g of the objective dendrimer I as a colorless viscous substance.

$^1$H-NMR(CDCl$_3$): 1.28 (72H, s, tert-Bu-H), 3.76 (3H, s, Me), 3.89 (12H, s, SCH$_2$), 7.10 (12H, s, ph-H), 7.30 (7H, s, ph-H), 7.78 (2H, s, ph-H)

Example 19

Production of Dendrimer II

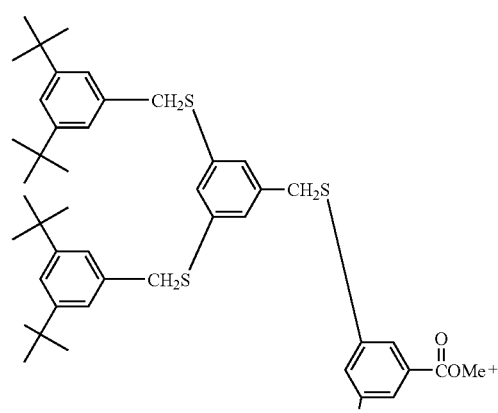

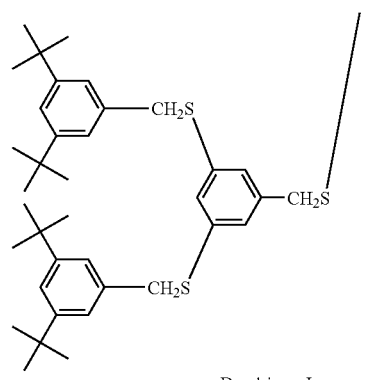

Dendrimer I

NaAl (OCH$_2$CH$_2$OMe)$_2$ (70% in toluene) $\xrightarrow{\text{toluene}}$

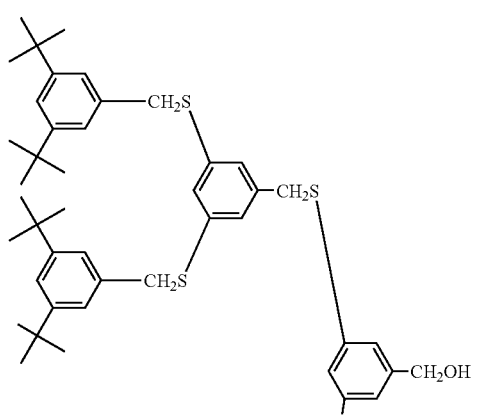

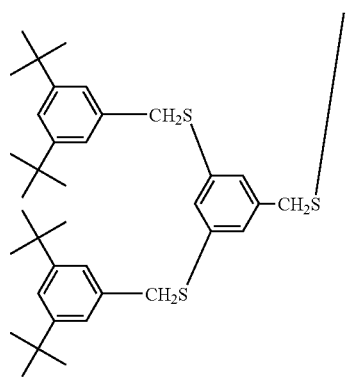

Dendrimer II

Dendrimer I (20.0 g, 15.17 mmol) was made to react in a manner similar to that in EXAMPLE 16, giving 13.4 g of dendrimer II as a colorless viscous substance.

$^1$H-NMR(CDCl$_3$): 1.40 (72H, s, tert-Bu-H), 4.03 (12H, s, SCH$_2$), 4.68 (2H, s, CH$_2$O), 7.09–7.16 (12H, m, ph-H), 7.30 (7H, s, ph-H), 7.76 (2H, s, ph-H)

Example 20

Production of Dendrimer III

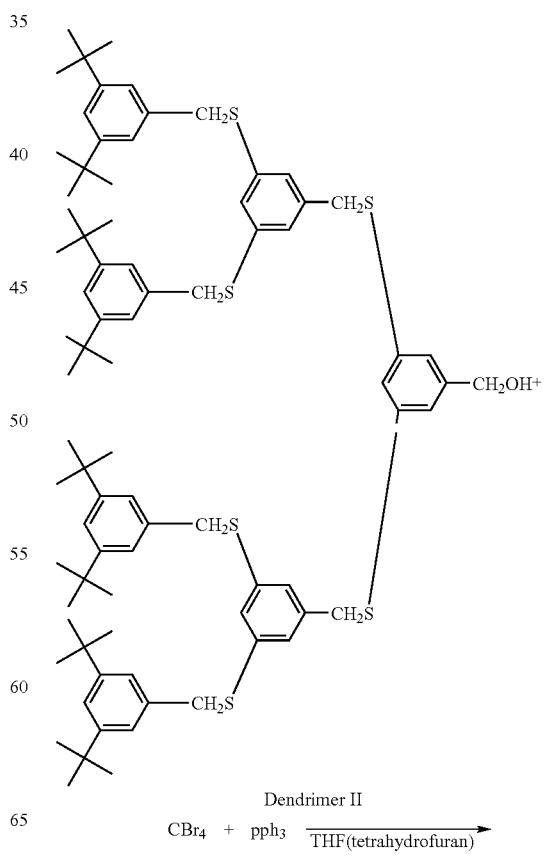

Dendrimer II

CBr$_4$ + pph$_3$ $\xrightarrow{\text{THF(tetrahydrofuran)}}$

-continued
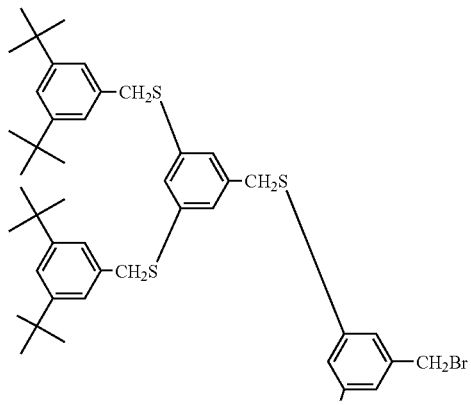
-continued
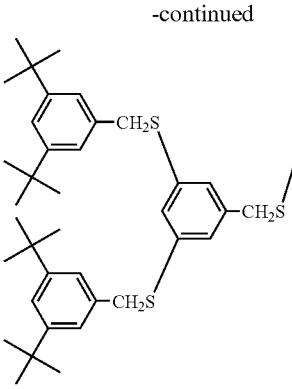
Dendrimer III
Dendrimer II (13.0 g, 10.0 mmol) was made to react in a manner similar to that in EXAMPLE 17, giving 6.7 g of dendrimer III as a colorless viscous substance.
$^1$H-NMR(CDCl$_3$): 1.40 (72H, s, tert-Bu-H), 4.02 (12H, s, SCH$_2$), 4.41 (2H, s, CH$_2$Br), 7.10–7.20 (12H, m, ph-H), 7.30 (7H, s, ph-H), 7.70 (2H, s, ph-H)
Example 21
Production of Dendrimer IV
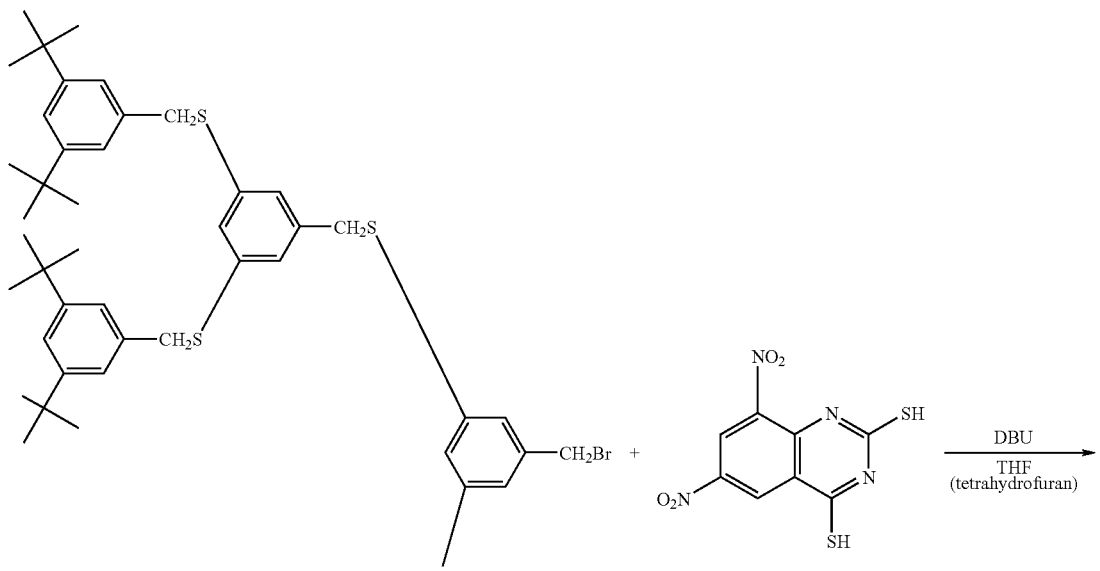

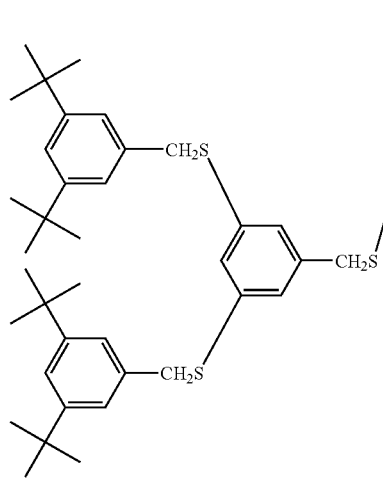
Dendrimer III
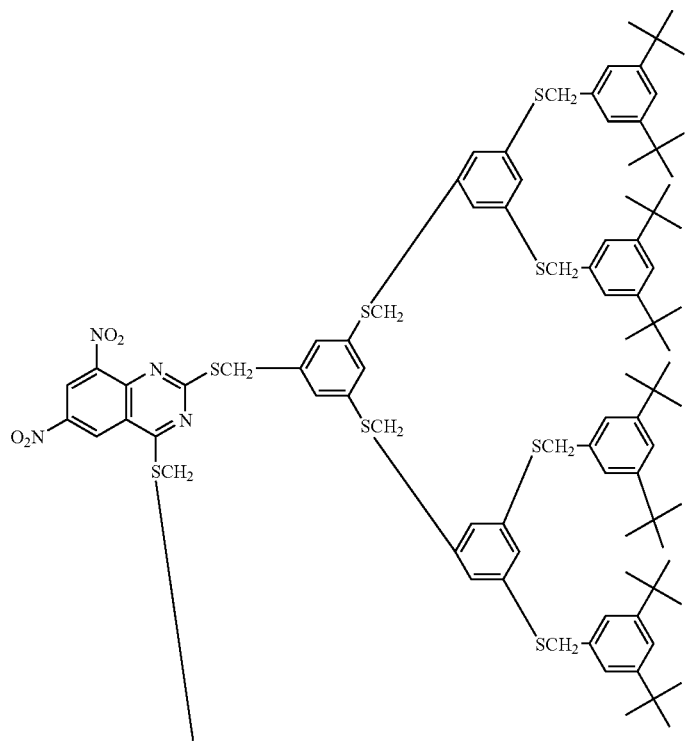

-continued

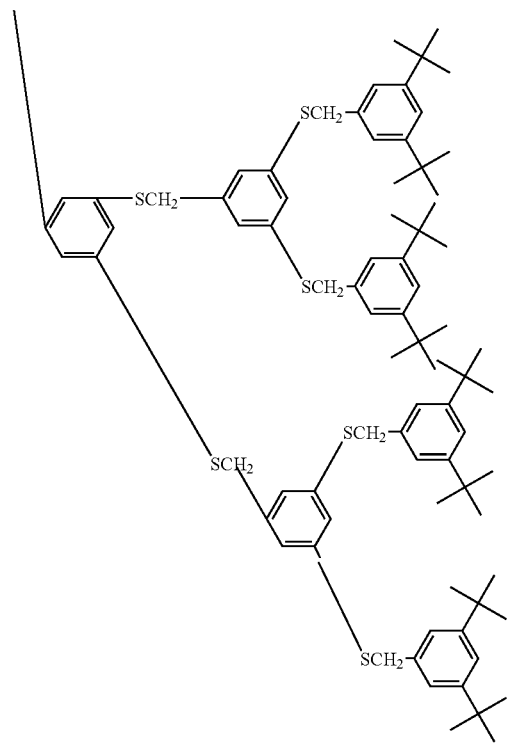

Dendrimer IV

Dendrimer III was made to react in a manner similar to that in EXAMPLE 18, giving dendrimer IV. Thus, dendrimer III was made to react according to an ordinary method with 6,8-dinitro-2,4-dimercaptoquinazoline and 1,8-diazabicyclo(5.4.0)undec-7-en in tetrahydrofuran, giving Dendrimer IV.

Example 22

Production of 3,5-Dimercaptobenzamide 3,5-Bis(dimethylcarbamoylthio)benzamide was subjected to hydrolysis with aqueous sodium hydroxide according to the ordinary procedure, giving 3,5-dimercaptobenzamide.

Example 23

Production of 3,5-Dimercaptoaniline

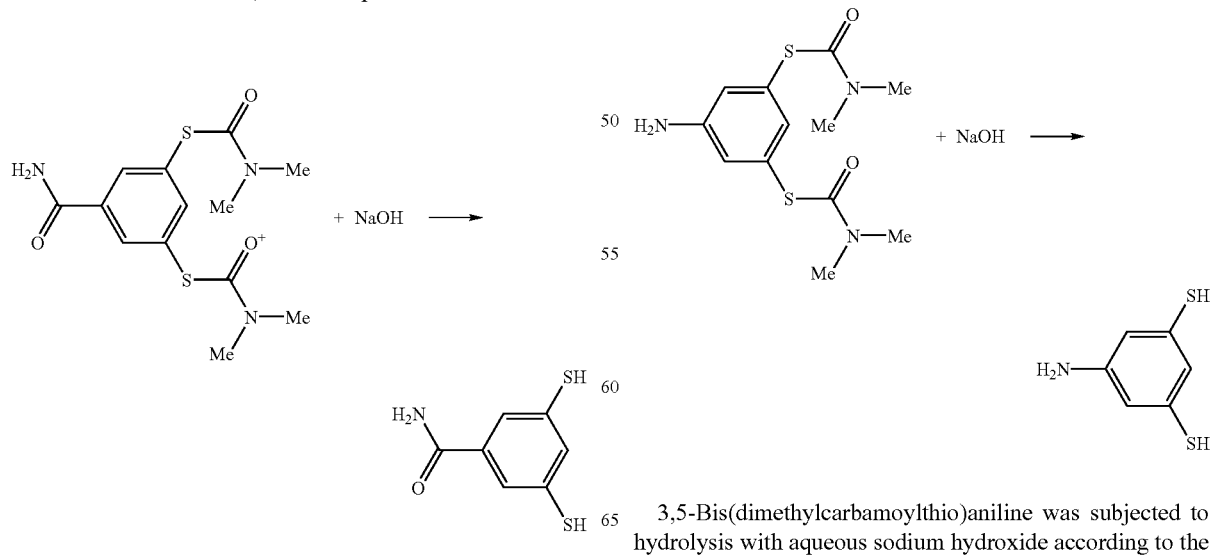

3,5-Bis(dimethylcarbamoylthio)aniline was subjected to hydrolysis with aqueous sodium hydroxide according to the ordinary procedure, giving 3,5-dimercaptoaniline.

Example 24

Production of 3,5-Dimercaptobenzonitile

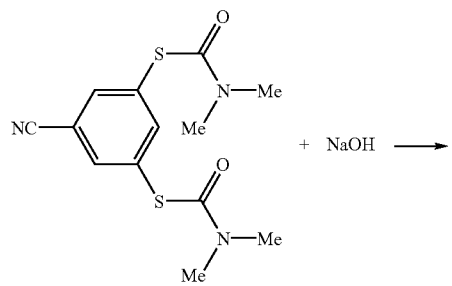

3,5-Bis(dimethylcarbamoylthio)benzonitrile was subjected to hydrolysis with aqueous sodium hydroxide according to the ordinary procedure, giving 3,5-dimercaptobenzonitile.

Example 25

Production of Methyl 3,5-Bis(3,5-di-tertiary-butylbenzylthio)benzoate

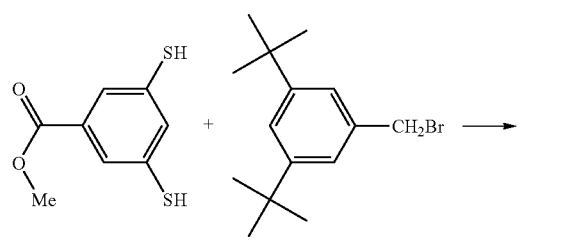

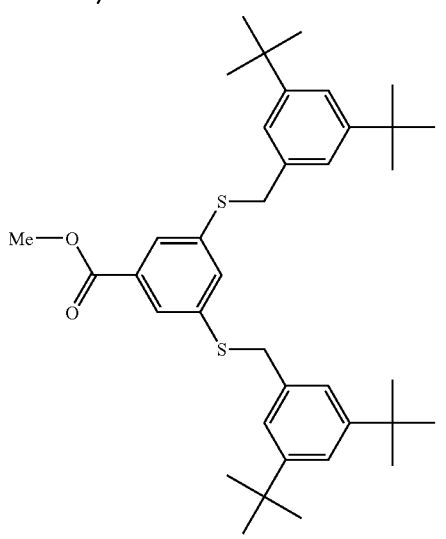

Methyl 3,5-dimercaptobenzoate (20.0 g, 100.0 mmol), 3,5-di-tertiarybutylbenzyl bromide (molecular weight 283.25, 57.0 g, 201.2 mmol) and potassium carbonate (molecular weight 138.21, 28.0 g, 202.6 mmol) were dissolved, in 350 ml of acetone and the mixture was heated under reflux for 12 hours. The acetone and salts were removed, and the residue was purified by means of chromatography with dichloromethane as the developing solvent, giving methyl 3,5-bis(3,5di-tertiary-butylbenzylthio)benzoate as needles.

In addition, throughout in this specification, % means weight %, and ratio of the solvents used are expressed in volume per volume.

Example 26

Production of Methyl 3-dimethylaminosulfurnyl-5-hydroxybenzoate

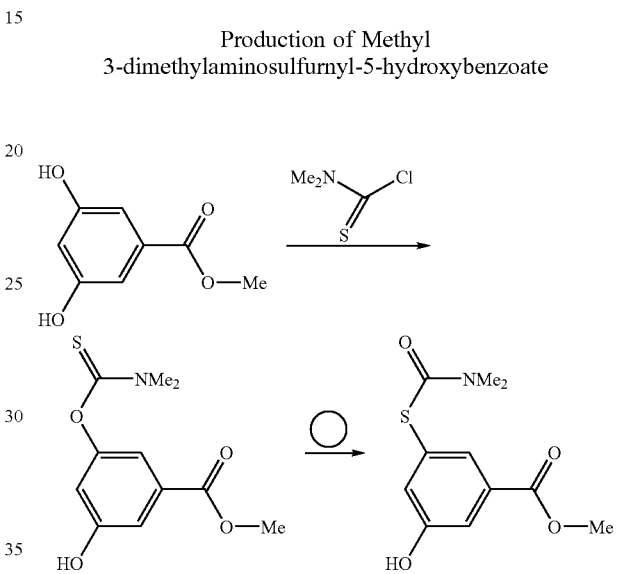

According to the method of EXAMPLE 5 or 6, but by the use of half amount of dimethylthiocarbamoyl chloride, methyl 3-dimethylaminosulfurnyl-5-hydroxybenzoate was produced from 3,5-dihydroxybenzoate at 26% yield. Melting point: 135 to 138° C.
$^1$H-NMR(CDCl$_3$); 3.00 & 3.05 (6H, s & s, 2×Me), 3.58 (1H, br-s, OH), 3.84 (3H, s, Me), 7.05, 7.47 & 7.78 (3H, s, s & s, Ph-H)

Example 27

The present invention is illustrated in more detail by reference to the following example. However, the present embodiment is to be considered in all respect as illustrative and not restrictive.

Figure 2:
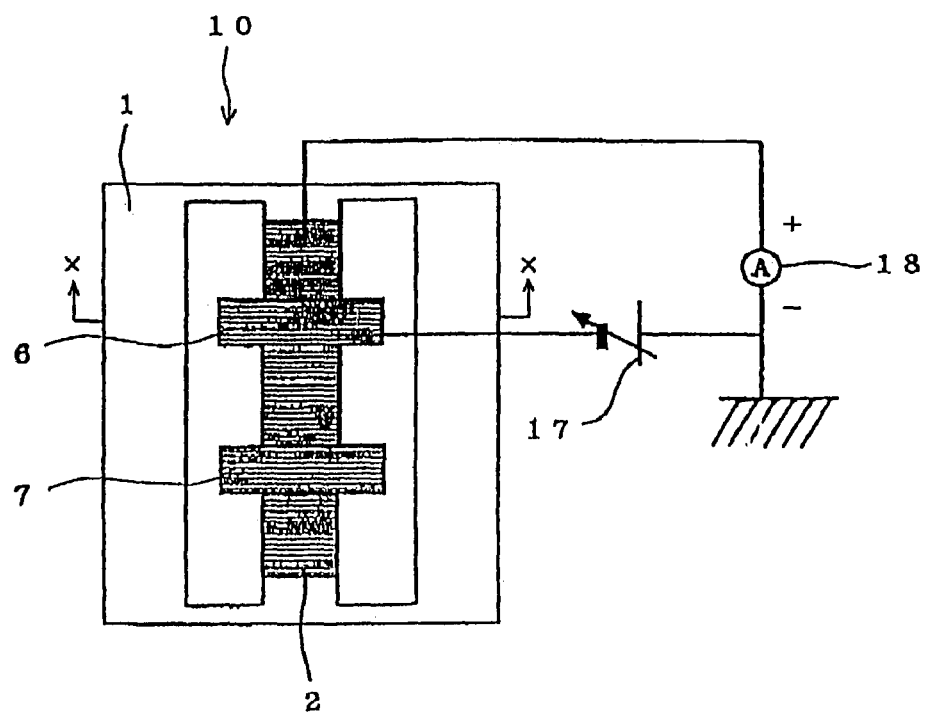
FIG. 2 shows the plan of a single electron tunneling device of an embodiment according to the present invention.
Figure 3:
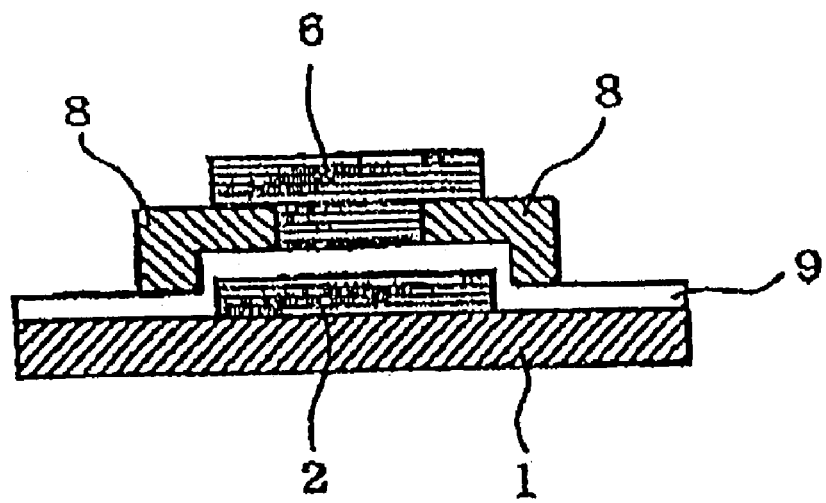
FIG. 3 is a vertical cross-sectional view taken on line X-Y of FIG. 2.
Figure 4:
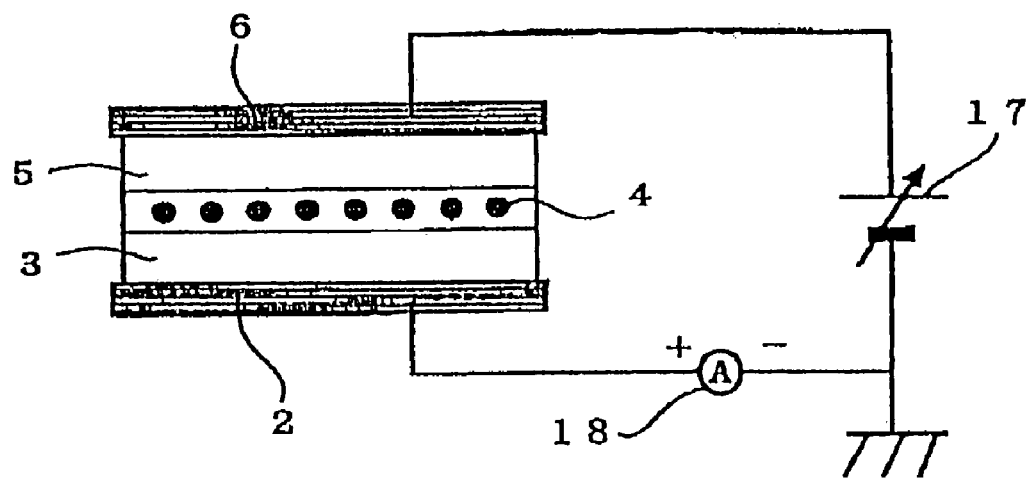
FIG. 4 is a diagram of the junction part of the device.

FIGS. 2 to 4 show schematic diagrams of a single electron tunneling device of the present invention. FIG. 2 shows the horizontal projection (plan), FIG. 3 a vertical cross-sectional view taken on line X-Y of FIG. 2, and FIG. 4 a magnified conceptual diagram of the junction part of the device. In FIG. 3, the numeral 9 indicates the electron tunneling layer consisting of the lower polyimide LB film layer 3, the intermediary electrode 4 and the upper poluimide LB film 5.

In this single electron tunneling device, a gold electrode being 100 nm thick and free from a surface oxide layer formation was formed on a glass substrate by the method of vacuum evaporation as the lower electrode. Next, on the lower electrode 2, the lower polyimide LB film layer 3, consisting of 25 polyimide LB films of the polyimide which has the degree of polymerization shown by Formula 25, was constructed by first depositing the layers of precursor by the Langmuir-Blodgett technique, followed by a chemical treatment. Then, by the procedure similar to that used for the preparation of the lower polyimide LB layer 3, the intermediary electrode 4 which consists of monomolecular layer of polyimide LB film containing dendritic molecules of the present invention, was formed using a mixture of the polyimide of Formula 25 and the dendritic molecule of the present invention shown in Formula 24 in a ratio of 500:1. Molecular occupied area measurement showed that, in the intermediary electrode obtained, there were about 1000 molecules of the compound of Formula 24 in an area of about 1 µm square. This electrode functioned as an intermediary electrode effectively. On the intermediary electrode layer 4, in a manner similar to that of the lower polyimide LB film layer 3, was deposited 30 layers of the polyimide precursor LB films, followed by imidation with a chemical treatment, giving the upper polyimide LB film layer 5.

Finally, on the upper LB film layer 5, the upper electrode 6 and the upper reserve electrode 7 of gold having a thickness of 50–100 nm and being free from a surface oxide layer formation were formed by the method of vacuum evaporation in the direction to cross the lower electrode 2, giving a single electron tunneling device. In the device of this EXAMPLE, the reserve upper electrode 7 was the additional one which was attached together with the upper electrode 6 for use to compare the characteristics of the device based on the present invention. Furthermore, the edge of the lower electrode 2 was covered with an edge-covering layer 8 in order to prevent both the dielectric breakdown from the edge of the lower electrode 2 and the short circuit due to defects among the lower polyimide LB film layer 3, the intermediary electrode layer 4 and the upper polyimide LB film layer 5. Consequently, following these procedures, a single electron tunneling device of the working area of 50×100 square µm was prepared.

With the single electron tunneling device prepared using the compound of the present invention, the electric current flow across the junction was measured by means of an ammeter 18 under applied step voltage 17 at a constant temperature in a cryostat. The measurement was carried out by the two-terminal network method, because the resistance between the lower electrode 2 and the upper electrode 6 amounted to 100 M to 10 GΩ.

Figure 5:
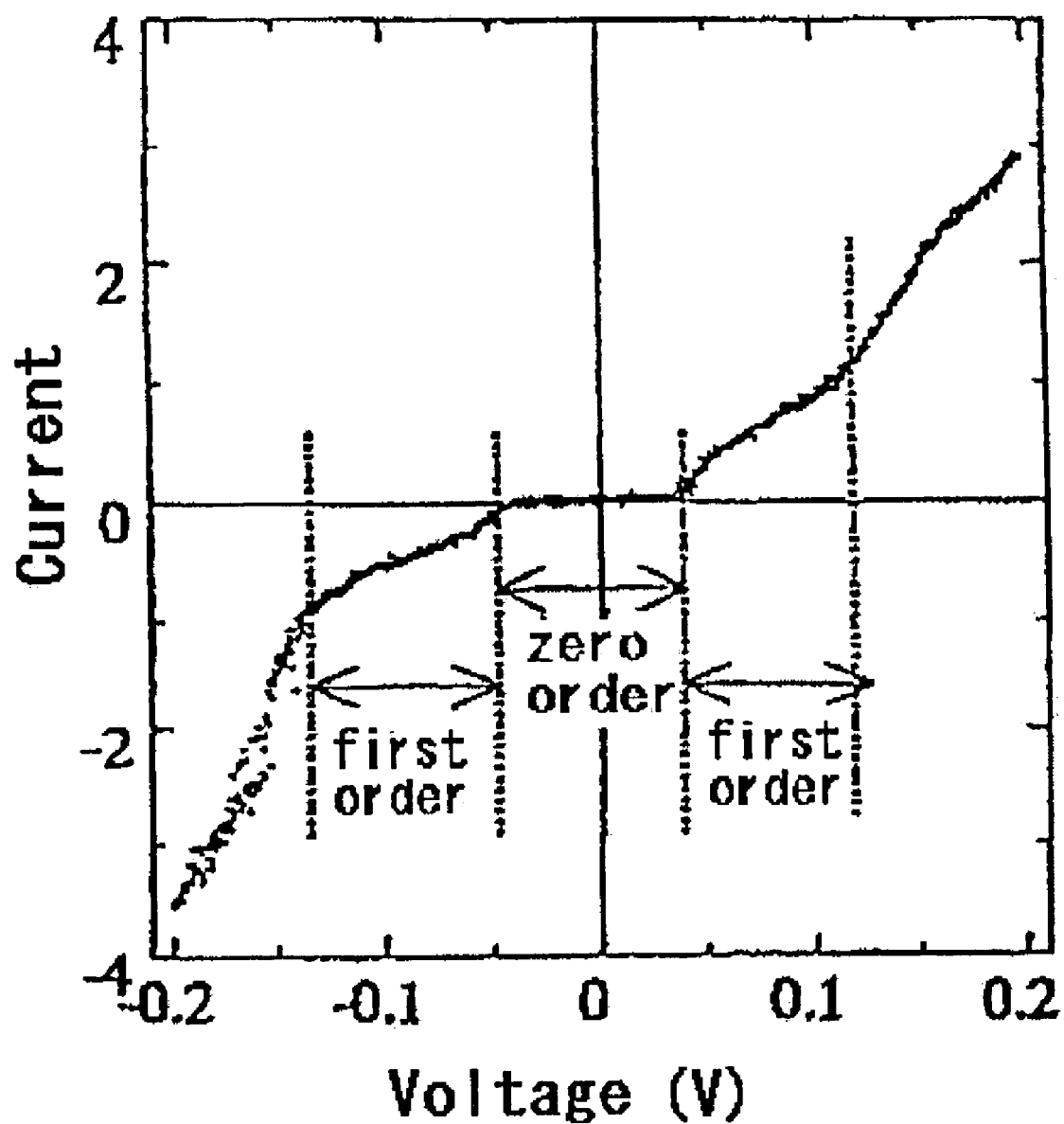
FIG. 5 is a graph showing the I-V (current to voltage) characteristic of a single electron tunneling device according to the present invention, which is measured at 5.2K.

FIG. 5 shows the I-V (current to voltage) characteristic measured at 5.2 K. This FIG. shows clearly, although at a cryogenic temperature of 5.2 K, an equally spaced voltage step structure characteristic of a single electron tunneling. It is known that the step width due to the single electron tunneling process uniformly equals to e/C, wherein C is the capacitance between the intermediary electrode 4 and the lower electrode 2 or the upper electrode 6 and e is the electric charge of an electron. As FIG. 5 shows, the voltage step width is uniformly about 100 mV, both in the zero and first orders, revealing clearly the characteristic of the single electron tunneling.

INDUSTRIAL APPLICABILITY

The dendritic molecules of the present invention respond immediately by emission of light when stimulated with light or electric energy, and are useful, for example, as switching material of memory.

What is claimed is:
1. Methyl 3,5-dimercaptobenzoate.

\* \* \* \* \*